US00RE48030E

(19) United States
(12) Reissued Patent
Friebel et al.

(10) Patent Number: US RE48,030 E
(45) Date of Reissued Patent: Jun. 2, 2020

(54) COMPUTER-IMPLEMENTED SYSTEM AND METHOD FOR TAGGED AND RECTANGULAR DATA PROCESSING

(71) Applicant: SAS Institute Inc., Cary, NC (US)

(72) Inventors: Anthony L. Friebel, Cary, NC (US); Thomas Warren Cox, Holly Springs, NC (US)

(73) Assignee: SAS INSTITUTE INC., Cary, NC (US)

(21) Appl. No.: 14/625,437

(22) Filed: Feb. 18, 2015

Related U.S. Patent Documents

Reissue of:
(64) Patent No.: 8,756,495
Issued: Jun. 17, 2014
Appl. No.: 12/750,994
Filed: Mar. 31, 2010

U.S. Applications:
(63) Continuation of application No. 10/126,937, filed on Apr. 19, 2002, now Pat. No. 7,921,359.

(51) Int. Cl.
*G06F 3/048* (2013.01)
*G06F 16/25* (2019.01)

(52) U.S. Cl.
CPC ..... *G06F 16/258* (2019.01)

(58) Field of Classification Search
CPC ..... G06F 17/30569; G06F 17/30
USPC ..... 715/249, 234, 239, 760, 805
See application file for complete search history.

(56) References Cited

U.S. PATENT DOCUMENTS 6,507,856 B1 1/2003 Chen et al.
6,532,427 B1 * 3/2003 Joshi ..... G06F 17/30864 700/108
6,601,071 B1 * 7/2003 Bowker et al. ..... 715/234
6,604,100 B1 * 8/2003 Fernandez et al.
6,626,957 B1 * 9/2003 Lippert et al. ..... 715/234
6,636,845 B2 * 10/2003 Chau et al.
6,643,633 B2 * 11/2003 Chau et al.
6,684,222 B1 * 1/2004 Cornelius et al.
6,704,736 B1 * 3/2004 Rys et al.
6,721,727 B2 * 4/2004 Chau et al.
6,732,095 B1 * 5/2004 Warshavsky et al.
6,785,673 B1 * 8/2004 Fernandez et al.
(Continued)

FOREIGN PATENT DOCUMENTS

WO 0182133 11/2001
WO WO 01/82133 A2 11/2001

OTHER PUBLICATIONS

Chen, Hsin-Hsi et al., "Mining Tables from Large Scale HTML Texts," Proceedings of the 18th Conference on Computational Linguistics, vol. I, pp. 166-172 (2000).

(Continued)

*Primary Examiner* — Peng Ke
(74) *Attorney, Agent, or Firm* — Kilpatrick Townsend & Stockton LLP

(57) ABSTRACT

A computer-implemented system and method for tagged data and rectangular data conversions. The system and method receive tagged input data that is in a non-rectangular format and that uses a hierarchical arrangement of tags to indicate data relationships. The tagged input data is displayed in a graphical interface, and the graphical interface is used to create a mapping specification from the tagged input data.

141 Claims, 29 Drawing Sheets

(56) References Cited

U.S. PATENT DOCUMENTS

| | | | | |
|---|---|---|---|---|
| 6,834,276 | B1 * | 12/2004 | Jensen | G06F 17/30882 |
| 6,853,997 | B2 * | 2/2005 | Wotring et al. | 707/756 |
| 6,871,204 | B2 * | 3/2005 | Krishnaprasad et al. | |
| 6,889,226 | B2 * | 5/2005 | O'Neil et al. | |
| 6,915,304 | B2 * | 7/2005 | Krupa | 707/756 |
| 6,915,306 | B1 * | 7/2005 | Gong et al. | |
| 6,959,416 | B2 * | 10/2005 | Manning | G06F 17/30595 707/999.003 |
| 6,976,212 | B2 * | 12/2005 | Newman | G06F 17/211 345/619 |
| 7,114,123 | B2 * | 9/2006 | Chen et al. | 715/205 |
| 7,191,167 | B1 * | 3/2007 | Turba | G06F 17/30309 707/792 |
| 7,337,177 | B2 * | 2/2008 | Rys | G06F 17/3061 707/769 |
| 7,921,359 | B2 * | 4/2011 | Friebel et al. | 715/249 |
| 8,140,496 | B2 * | 3/2012 | Rys | G06F 17/3061 707/696 |
| 8,756,495 | B2 | 6/2014 | Friebel et al. | |
| 2001/0034748 | A1 * | 10/2001 | Bimson et al. | 707/530 |
| 2001/0047372 | A1 * | 11/2001 | Gorelik et al. | 707/514 |
| 2002/0078068 | A1 * | 6/2002 | Krishnaprasad et al. | 707/104.1 |
| 2002/0091702 | A1 * | 7/2002 | Mullins | 707/100 |
| 2002/0099687 | A1 * | 7/2002 | Krishnaprasad et al. | 707/1 |
| 2002/0124045 | A1 * | 9/2002 | Moore et al. | 709/201 |
| 2002/0129059 | A1 * | 9/2002 | Eck | 707/513 |
| 2002/0133484 | A1 * | 9/2002 | Chau et al. | 707/3 |
| 2002/0156772 | A1 * | 10/2002 | Chau et al. | 707/3 |
| 2003/0014397 | A1 * | 1/2003 | Chau et al. | 707/3 |
| 2003/0018661 | A1 * | 1/2003 | Darugar | 707/500 |

OTHER PUBLICATIONS

Altova Inc, "XML Spy Manual", 408 pages 1998-2001.*

Bourret, R. et al., "A Generic Load/Extract Utility for Data Transfer Between XML Documents and Relational Databases", IEEE, pp. 1-10 [2000].

Lee, Dongwon et al., "CPI: Constraints—Preserving Inlining algorithm for mapping XML DTD to relational schema", Data & Knowledge Engineering, vol. 39, pp. 3-25 [2001].

Rys, Michael, "Bringing the Internet to Your Database: Using SQL Server 2000 and XML to Build Loosely-Coupled Systems", IEEE, pp. 465-472 [2001].

* cited by examiner

```
<?xml version = '1.0' ?>                                   150
<SXLEMAP version = '1.0'>
152 <TABLE name = 'TEAMS'>
156     <TABLE_XPATH>
            /NHL/CONFERENCE/DIVISION/TEAM                  154
156     </TABLE_XPATH>
            <COLUMN name = 'name'>                         160
162         <XPATH>
                /NHL/CONFERENCE/DIVISION/TEAM/@name
162         </XPATH>
            <TYPE>character</TYPE>                         164
164
166         <DATATYPE>STRING</DATATYPE>                    166
            <LENGTH>30</LENGTH>                            168
168         </COLUMN>                                      160
170     <COLUMN name = 'abbrev'>
172         <XPATH>
                /NHL/CONFERENCE/DIVISION/TEAM/@abbrev
172         </XPATH>
174         <TYPE>character</TYPE>                         174
176         <DATATYPE>STRING</DATATYPE>                    176
            <LENGTH>3</LENGTH>                             178
170     </COLUMN>
180     <COLUMN name = 'CONFERENCE' retain = 'YES'>
182         <XPATH>/NHL/CONFERENCE</XPATH>                 182
184         <TYPE>character</TYPE>                         184
186         <DATATYPE>STRING</DATATYPE>                    186
            <LENGTH>10</LENGTH>
180         </COLUMN>                                      188 188
190     <COLUMN name = 'DIVISION' retain = 'YES'>
192         <XPATH>
                /NHL/CONFERENCE/DIVISION
192         </XPATH>
194         <TYPE>character</TYPE>                         194
196         <DATATYPE>STRING</DATATYPE>                    196
            <LENGTH>10</LENGTH>
190         </COLUMN>                                      198 198
    </TABLE>
</SXLEMAP>                                                 152
```

*Fig. 4*

200

TEAMS 202

| 204 CONFERENCE | 206 DIVISION | 208 name | 210 abbrev |
|---|---|---|---|
| Eastern | Southeast | Thrashers | ATL |
| Eastern | Southeast | Hurricanes | CAR |
| Eastern | Southeast | Panthers | FLA |
| Eastern | Southeast | Lightning | TB |
| Eastern | Southeast | Capitals | WSH |
| Western | Pacific | Stars | DAL |
| Western | Pacific | Kings | LA |
| Western | Pacific | Ducks | ANA |
| Western | Pacific | Coyotes | PHX |
| Western | Pacific | Sharks | SJ |

Fig. 5

250

```
<?xml version = '1.0' encoding = 'iso-8859-1' ?>
<Library>
  <Publication>
    <Title>Developer&apos;s Almanac</Title>
  <Acquired>12-11-2000</Acquired>
    <Topic Major = 'Y'>JAVA</Topic>
  </Publication>
  <Publication>
    <Title>Inside Visual C++</Title>
  <Acquired>06-19-1998</Acquired>
    <Topic Major = 'Y'>C</Topic>
    <Topic>Reference</Topic>
  </Publication>
  <Publication>
    <Title>Core Servlets</Title>
    <Acquired>05-30-2001</Acquired>
    <Topic Major = 'Y'>JAVA</Topic>
    <Topic>Servlets</Topic>
    <Topic>Reference</Topic>
  </Publication>
</Library
```

252 252 254 254 256 256 258 258 260 262 264 266 268 270 272 272 274 274

Fig. 6

```
<?xml version = '1.0' ?>
<SXLEMAP version = '1.0'>                                   300
302 <TABLE name = 'Publication'>
      306 <TABLE_XPATH>
            /Library/Publication/Topic  304
      306 </TABLE_XPATH>
310 <COLUMN name = 'Title' retain = 'YES'>
      312 <XPATH>
            /Library/Publication/Title
      312 </XPATH>
314 <TYPE>character</TYPE>  314
      316 <DATATYPE>STRING</DATATYPE>  316
            <LENGTH>19</LENGTH>
310 </COLUMN>  318  318
320 <COLUMN name = 'Acquired' retain = 'YES'>
      322 <XPATH>
            /Library/Publication/Acquired
      322 </XPATH>
324 <TYPE>numeric</TYPE>  324
      326 <DATATYPE>FLOAT</DATATYPE>  326
      327 <LENGTH>10</LENGTH>  327
      328 <FORMAT width = '10' >mmddyy</FORMAT>  328
            <INFORMAT width = '10' >mmddyy/INFORMAT>
320 </COLUMN>  329  329
330 <COLUMN name = 'TOPIC'>
      332 <XPATH>
            /Library/Publication/Topic</XPATH>  332
      334 <TYPE>character<TYPE>  334
      336 <DATATYPE>STRING</DATATYPE>  336
      338 <LENGTH>9</LENGTH>  338
330 </COLUMN>
340 <COLUMN name = 'Major'>
      342 <XPATH>
            /Library/Publication/Topic/@Major
      342 </XPATH>
      344 <TYPE>character<TYPE>  344
      346 <DATATYPE>STRING</DATATYPE>  346
            <LENGTH>1</LENGTH>
      350 <ENUM>  348  348
      352 <VALUE>Y</VALUE>  352
            <VALUE>N</VALUE>
      350 </ENUM>  354  354
            <DEFAULT>N</DEFAULT>
302 </COLUMN>  356  356
    </TABLE>  340
</SXLEMAP>
```

Fig. 7

370

| 374 Title | 372 Publication | 376 Acquired | 378 Topic | 380 Major |
|---|---|---|---|---|
| Developer's Almanac | | 12/11/2000 | JAVA | Y |
| Inside Visual C++ | | 06/19/1998 | C | Y |
| Inside Visual C++ | | 06/19/1998 | Reference | N |
| Core Servlets | | 05/30/2001 | JAVA | Y |
| Core Servlets | | 05/30/2001 | Servlets | N |
| Core Servlets | | 05/30/2001 | Reference | N |

*Fig. 8*

600

```
<?xml version="1.0" encoding="iso-8859-1" ?>
<NHL>
  <CONFERENCE> Eastern
    <DIVISION> Atlantic
      <TEAM name="New Jersey Devils" abbrev="NJ" />
      <TEAM name="New York Islanders" abbrev="NYI" />
      <TEAM name="New York Rangers" abbrev="NYR" />
      <TEAM name="Philadelphia Flyers" abbrev="PHI" />
      <TEAM name="Pittsburgh Penguins" abbrev="PGH" />
    </DIVISION>
  </CONFERENCE>
</NHL>
```

FIG. 17

620

```
<?xml version="1.0" encoding="iso-8859-1" ?>
<SXLEMAP version="1.2" name="Section42"
          description="String Functions Example">
  <TABLE name="concat">
    <TABLE-PATH> /NHL/CONFERENCE/DIVISION/TEAM </TABLE-PATH>
    <COLUMN name="concatpostfix">
      <TYPE> character </TYPE>
      <DATATYPE> string </DATATYPE>
      <PATH function="concat" string="(NHL)">
        /NHL/CONFERENCE/DIVISION/TEAM/@name
      </PATH>
    </COLUMN>
    <COLUMN name="concatprefix">
      <TYPE> character </TYPE>
      <DATATYPE> string </DATATYPE>
      <PATH function="concat" pattern="2001-2002 ">
        /NHL/CONFERENCE/DIVISION/TEAM/@name
      </PATH>
    </COLUMN>
    <COLUMN name="concat">
      <TYPE> character </TYPE>
      <DATATYPE> string </DATATYPE>
      <PATH function="concat" pattern="2001-2002 " string="(NHL)">
        /NHL/CONFERENCE/DIVISION/TEAM/@name
      </PATH>
    </COLUMN>
  </TABLE>

  <TABLE name="starts-with">
    <TABLE-PATH> /NHL/CONFERENCE/DIVISION/TEAM </TABLE-PATH>
    <COLUMN name="newyork">
      <TYPE> character </TYPE>
      <DATATYPE> string </DATATYPE>
      <PATH function="starts-with" pattern="New York">
        /NHL/CONFERENCE/DIVISION/TEAM/@name
      </PATH>
    </COLUMN>
  </TABLE>
```

630

630

640

640

FIG. 18A

620

```
650  <TABLE name="contains">
       <TABLE-PATH> /NHL/CONFERENCE/DIVISION/TEAM </TABLE-PATH>
       <COLUMN name="new">
         <TYPE> character </TYPE>
         <DATATYPE> string </DATATYPE>
         <PATH function="contains" pattern="New">
           /NHL/CONFERENCE/DIVISION/TEAM/@name
         </PATH>
       </COLUMN>
650  </TABLE>

660  <TABLE name="substring-before">
       <TABLE-PATH> /NHL/CONFERENCE/DIVISION/TEAM </TABLE-PATH>
       <COLUMN name="york">
         <TYPE> character </TYPE>
         <DATATYPE> string </DATATYPE>
         <PATH function="substring-before" pattern="York">
           /NHL/CONFERENCE/DIVISION/TEAM/@name
         </PATH>
       </COLUMN>
660  </TABLE>

670  <TABLE name="substring-after">
       <TABLE-PATH> /NHL/CONFERENCE/DIVISION/TEAM </TABLE-PATH>
       <COLUMN name="new">
         <TYPE> character </TYPE>
         <DATATYPE> string </DATATYPE>
         <PATH function="substring-after" pattern="New">
           /NHL/CONFERENCE/DIVISION/TEAM/@name
         </PATH>
       </COLUMN>
670  </TABLE>
```

FIG. 18B

620

```
680  <TABLE name="substring">
       <TABLE-PATH> /NHL/CONFERENCE/DIVISION/TEAM </TABLE-PATH>
       <COLUMN name="first-five">
         <TYPE> character </TYPE>
         <DATATYPE> string </DATATYPE>
         <PATH function="substring" index="1" length="5">
           /NHL/CONFERENCE/DIVISION/TEAM/@name
         </PATH>
       </COLUMN>
       <COLUMN name="fifth-on">
         <TYPE> character </TYPE>
         <DATATYPE> string </DATATYPE>
         <PATH function="substring" index="5">
           /NHL/CONFERENCE/DIVISION/TEAM/@name
         </PATH>
       </COLUMN>
       <COLUMN name="fifth-eight">
         <TYPE> character </TYPE>
         <DATATYPE> string </DATATYPE>
         <PATH function="substring" index="5" length="4">
           /NHL/CONFERENCE/DIVISION/TEAM/@name
         </PATH>
       </COLUMN>
     </TABLE>
680

690  <TABLE name="string-length">
       <TABLE-PATH> /NHL/CONFERENCE/DIVISION/TEAM </TABLE-PATH>
       <COLUMN name="strlen">
         <TYPE> numeric </TYPE>
         <DATATYPE> integer </DATATYPE>
         <PATH function="string-length">
           /NHL/CONFERENCE/DIVISION/TEAM/@name
         </PATH>
       </COLUMN>
     </TABLE>
690
```

FIG. 18C

620

```
<TABLE name="normalize">
<TABLE-PATH> /NHL/CONFERENCE/DIVISION/TEAM </TABLE-PATH>    <COLUMN name="space">
    <TYPE> character </TYPE>
    <DATATYPE> string </DATATYPE>
    <PATH function="normalize-space">
      /NHL/CONFERENCE/DIVISION/TEAM/@name
    </PATH>
  </COLUMN>
</TABLE>

<TABLE name="translate">
  <TABLE-PATH> /NHL/CONFERENCE/DIVISION/TEAM </TABLE-PATH>
  <COLUMN name="original">
    <TYPE> character </TYPE>
    <DATATYPE> string </DATATYPE>
    <PATH> /NHL/CONFERENCE/DIVISION/TEAM/@name </PATH>
  </COLUMN>
  <COLUMN name="result">
    <TYPE> character </TYPE>
    <DATATYPE> string </DATATYPE>
    <PATH function="translate" pattern="New" string="Old">
      /NHL/CONFERENCE/DIVISION/TEAM/@name
    </PATH>
  </COLUMN>
</TABLE>
</SXLEMAP>
```

700

700

710

710

FIG. 18D

750 concat

| concatpostfix | concatprefix | concat |
|---|---|---|
| New Jersey Devils (NHL) | 2001-2002 New Jersey Devils | 2001-2002 New Jersey Devils (NHL) |
| New York Islanders (NHL) | 2001-2002 New York Islanders | 2001-2002 New York Islanders (NHL) |
| New York Rangers (NHL) | 2001-2002 New York Rangers | 2001-2002 New York Rangers (NHL) |
| Philadelphia Flyers (NHL) | 2001-2002 Philadelphia Flyers | 2001-2002 Philadelphia Flyers (NHL) |
| Pittsburgh Penguins (NHL) | 2001-2002 Pittsburgh Penguins | 2001-2002 Pittsburgh Penguins (NHL) |

760 starts-with

| newyork |
|---|
| false |
| true |
| true |
| false |
| false |

770 contains

| new |
|---|
| true |
| true |
| true |
| false |
| false |

FIG. 19A

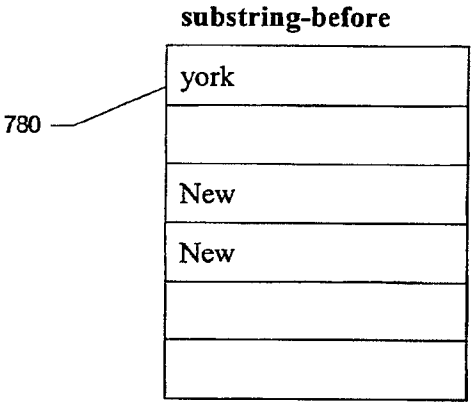
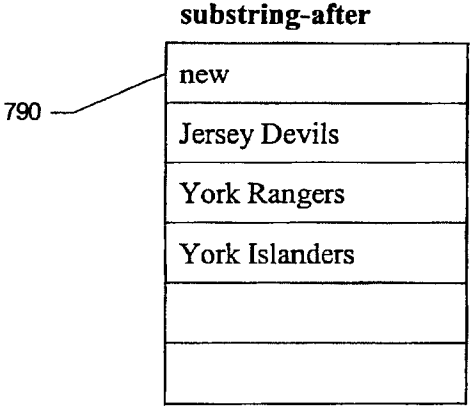
FIG. 19B

800 substring

| first-five | fifth-on | five-eight |
|---|---|---|
| New J | Jersey Devils | Jers |
| New Y | York Islanders | York |
| New Y | York Rangers | York |
| Phila | adelphia Flyers | adel |
| Pitts | sburgh Penguins | sbur |

810 string-length

| strlen |
|---|
| 17 |
| 18 |
| 16 |
| 19 |
| 19 |

FIG. 19C

820 normalize

| space |
| --- |
| New Jersey Devils |
| New York Islanders |
| New York Rangers |
| Philadelphia Flyers |
| Pittsburgh Penguins |

830 translate

| original | result |
| --- | --- |
| New Jersey Devils | Old Jlrsly Dlvils |
| New York Islanders | Old York IslaOdlrs |
| New York Rangers | Old York RaOglrs |
| Philadelphia Flyers | Philadllphia Flylrs |
| Pittsburgh Penguins | Pittsburgh PlOguiOs |

FIG. 19D

COMPUTER-IMPLEMENTED SYSTEM AND METHOD FOR TAGGED AND RECTANGULAR DATA PROCESSING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[RELATED APPLICATION] *CROSS-REFERENCE TO RELATED APPLICATIONS*

[This application is a continuation of U.S. patent application Ser. No. 10/126,937, filed on Apr. 19, 2002, now U.S. Pat. No. 7,921,359 which is incorporated by reference.]

*This application is a reissue application of its parent U.S. patent application Ser. No. 12/750,994 filed on Mar. 31, 2010, now U.S. Pat. No. 8,756,495 B2 issued on Jun. 17, 2014, which is a continuation of U.S. patent application Ser. No. 10/126,937 filed on Apr. 19, 2002, now U.S. Pat. No. 7,921,359 B2 issued on Apr. 5, 2011.*

*The entire contents of each of these applications are hereby incorporated by reference in their entirety.*

FIELD OF THE INVENTION

The present invention relates generally to computer-implemented data conversions and more particularly to tagged and rectangular data processing.

BACKGROUND AND SUMMARY

Software applications exchange data in a variety of formats. Two of the more prevalent formats are the tagged hierarchical data format and the rectangular data format. Tagged hierarchical data formats, such as the eXtensible Markup Language (XML) format, are becoming increasingly popular as they provide a useful data exchange medium for Internet software applications. Rectangular data formats are also widely used as their tabular format is the cornerstone of most database systems.

Incompatibility difficulties arise when software systems using different formats seek to exchange data. The present invention overcomes such difficulties and others by providing a computer-implemented system and method for tagged data and rectangular data conversions. The system and method receive tagged input data that is in a non-rectangular format and that uses a hierarchical arrangement of tags to indicate data relationships. The tagged input data is displayed in a graphical interface, and the graphical interface is used to create a mapping specification from the tagged input data.

BRIEF DESCRIPTION OF THE DRAWINGS

FIG. 4 is a data structure diagram depicting an example of a mapping specification;

FIG. 5 is a data structure diagram depicting an example of output rectangular formatted data;

FIG. 6 is a data structure diagram depicting a second example of an input tagged data file;

FIG. 7 is a data structure diagram depicting a second example of a mapping specification;

FIG. 8 is a data structure diagram depicting a second example of output rectangular formatted data;

FIG. 17 is a data structure diagram depicting another example of an input tagged data file;

FIGS. 18A-18D are data structure diagrams depicting another example of a mapping specification;

FIGS. 19A-19D are data structure diagrams depicting another example of output rectangular formatted data.

DETAILED DESCRIPTION

Figure 1:
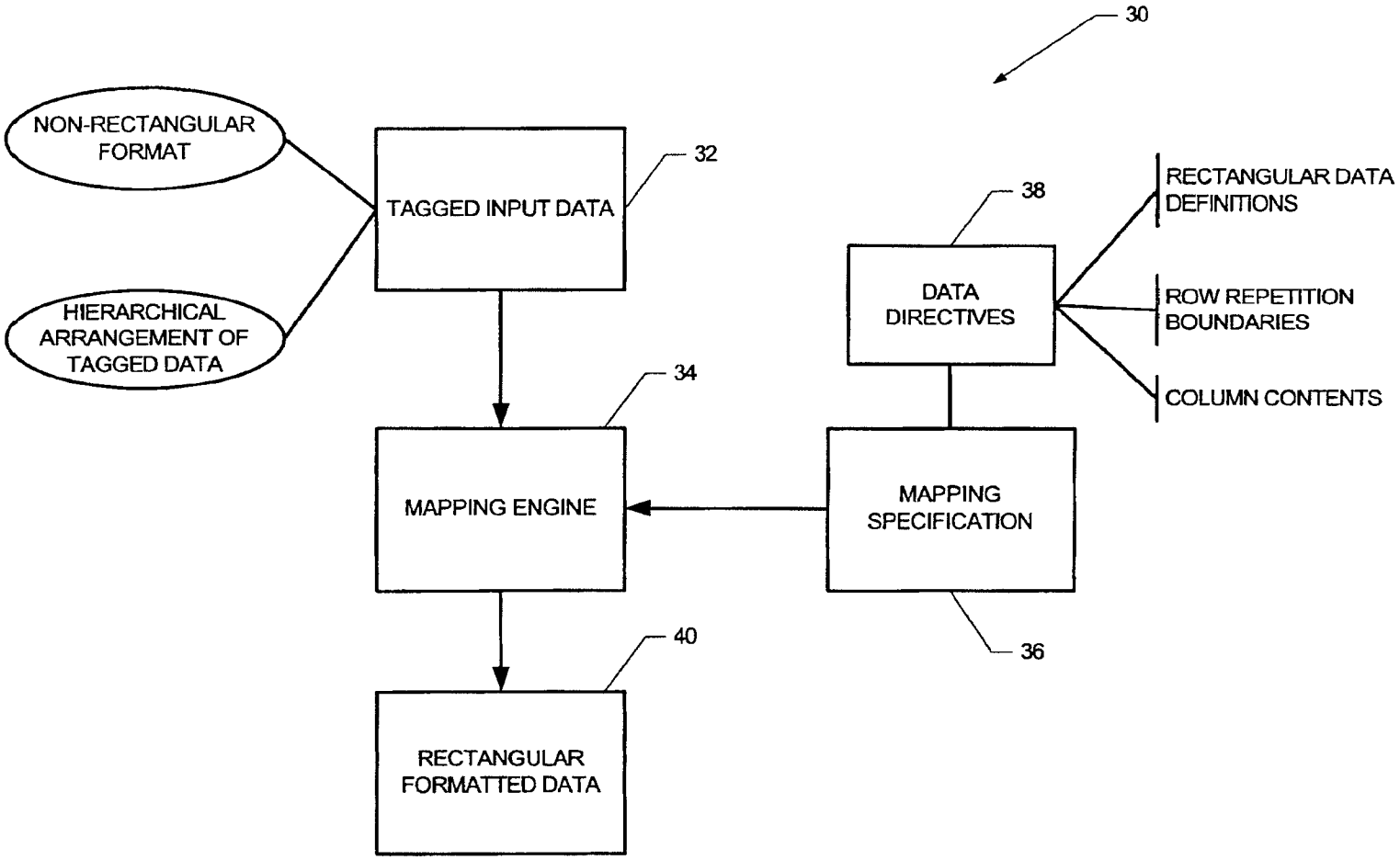
FIG. 1 is a block diagram depicting software and computer components utilized in processing a tagged input data file.

FIG. 1 depicts a computer-implemented system 30 that handles tagged and rectangular data formats. In the example of FIG. 1, the system 30 converts non-rectangular formatted data 32 into rectangular formatted data 40. The conversion can serve many uses, such as to import the converted input data into one or more tables within a relational database management system (RDBMS).

The input data 32 may be considered non-rectangular due to a number of reasons, such as its data items being arranged in a "columnless" tagged hierarchical format. The tags in the hierarchy show how one data item relates to another data item. Data in an eXtensible Markup Language (XML) format is an example of a tagged hierarchical format.

The system 30 uses a mapping specification 36 to determine how the rectangular formatted output data 40 is to be formed from the tagged input data 32. The mapping specification 36 includes data directives 38 to define how the rectangular output 40 is to be constructed. This may include what columns are to be formed from the tagged input data items; when is a new row in the output to be initiated; and what format the output columns are to assume.

A software mapping engine 34 reads the tagged input data 32 and the mapping specification 36. The mapping engine 34 parses the tagged input data 32 in accordance with the data directives 38 contained in the mapping specification 36. The mapping engine 36 assembles the parsed information into the column format dictated by the data directives 38. The assembled columns are then placed in an output file 40.

Figure 2:
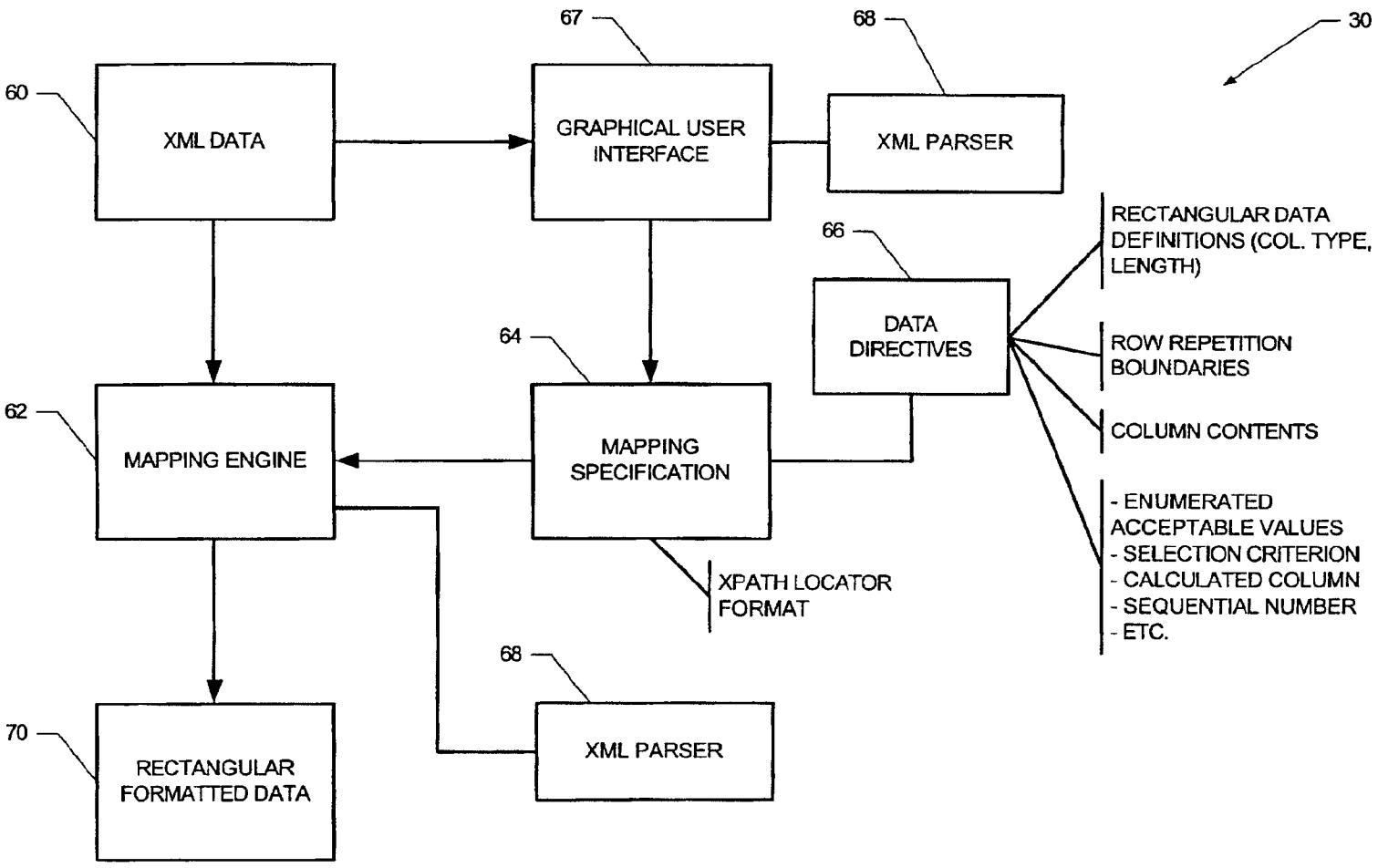
FIG. 2 is a block diagram depicting software and computer components utilized in a different embodiment for processing a tagged input data file.

FIG. 2 shows a different embodiment for processing a tagged input data file 60 that is in an XML data format. In this different embodiment, the mapping specification 64 indicates through an XPath locator format the locations of the tagged input data 60 that is to form the rectangular formatted output 70. For example, if the tagged input data 60 indicates what sport teams are in which conferences and divisions in the National Hockey League (NHL), the mapping specification 64 can use the following XPath locator to identify where the team data is located in the input tagged file: /NHL/CONFERENCE/DIVISION/TEAM. This XPath locator specifies that team information can be collected from the following hierarchical data structure: Teams are contained in Divisions which are contained in Conferences which are contained in the NHL. Based upon the XPath locator, the mapping engine 62 uses an off the shelf XML parser 68 to locate and extract the team data from the tagged input data file 60. The mapping specification 64 may also specify through other XPath locators how to extract other data from the tagged input data file 60, such as data for the other output columns.

In this different embodiment, the mapping specification 64 may be supplemented with additional data directives 66, such as enumerating what are acceptable values to be placed in the rectangular formatted output data 70. For example, a data directive may specify that only "YES" or "NO" values are acceptable for a particular output column. The data directive may also use a selection criterion to filter the values being placed in the rectangular formatted output data 70. In the NHL situation, a selection criteria may specify that only NHL teams whose names begin with the letter "S" are to part of the output. Thus, the teams "Sharks" and "Stars" will be included, but not the team "Thrashers". Other data directives 66 include deriving an output value based upon two or more data items contained in the tagged input data file 60, or associating a sequential counter value with each new row in the output 70.

A graphical user interface 67 may help a user create the data directives 66. Through the graphical user interface 67, a user can see the data items and their relationships contained in the tagged input data file 60. In the NHL example, the user can ascertain more efficiently the mechanism needed to access the teams data within the XML data hierarchy. To generate data for the graphical user interface 67, the data items and their relationships in the XML data file 60 are parsed via an off-the-shelf XML parser 68. Via the graphical user interface 67, the user can select which data items in the XML data file 60 are to form columns in the rectangular output data file 70. The user can also specify column format, selection criteria and other data directives for the column formation.

It should be understood that the system 30 may accept a data stream of XML data instead of a file. In such a situation, the system 30 parses and stores the tagged information as it is received via the data stream and creates new rows when it has received sufficient information from the data stream to form a new row. Moreover, it should be understood that the system 30 may provide its output as a data stream when it creates new rows.

Figure 3:
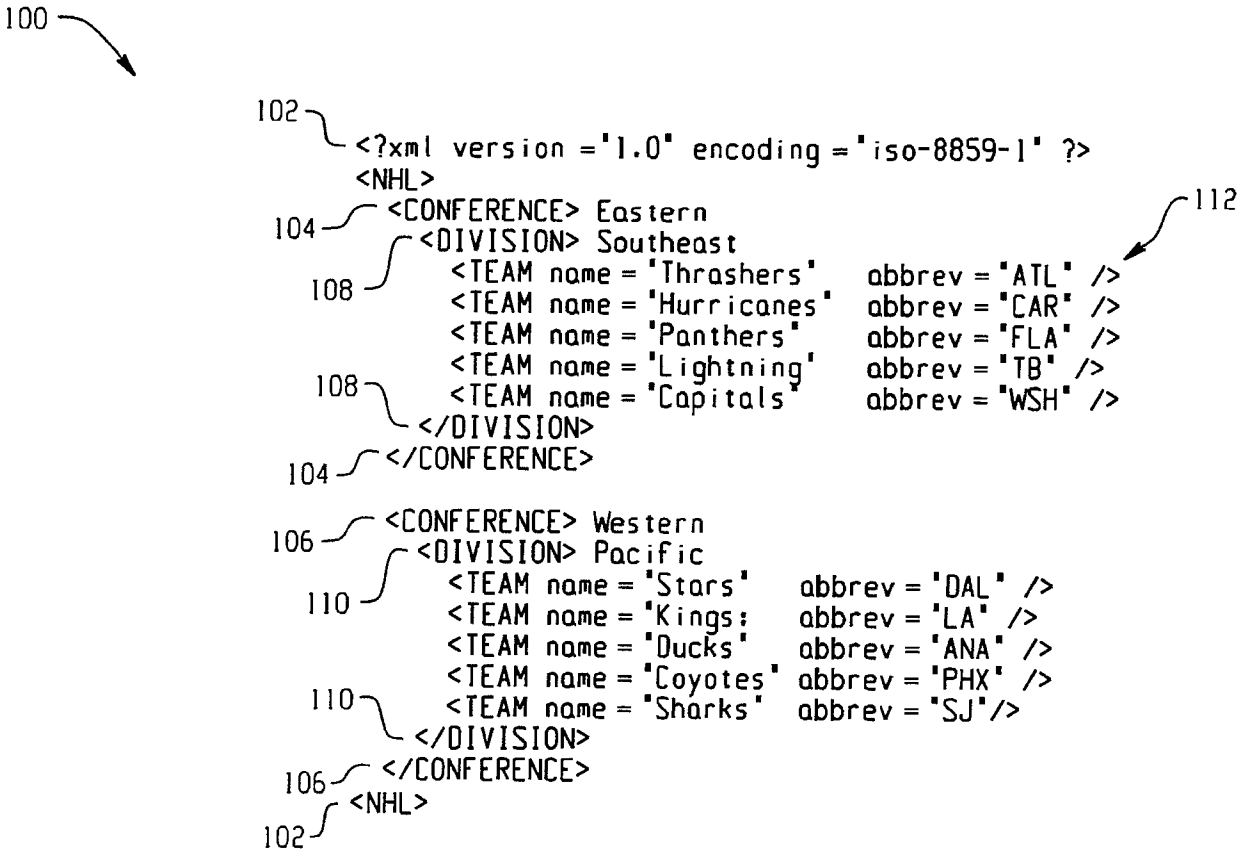
FIG. 3 is a data structure diagram depicting an example of an input tagged data file.

FIGS. 3-5 show an example where the system converts XML data into rectangular formatted data. FIG. 3 shows the input XML data structure 100 for this example. The XML data structure 100 contains tagged hierarchical data about National Hockey League (NHL) teams, such as what teams are in which divisions, and what divisions are in which conferences. NHL tags 102 enclose NHL conference, division, and team data as well their data relationships. The first conference tags 104 contain the Eastern conference data, and the second conference tags 106 contain the Western conference data. The first division tags 108 contain the Southeast division data, and the second division tags 110 contain the Pacific division data. Name and abbreviation attributes within team tags respectively provide the names and abbreviations of the teams. For example, team tag 112 contains the name attribute "Thrashers" and the team abbreviation attribute "ATL".

To convert the XML data into a rectangular format, a mapping specification is constructed. FIG. 4 shows an example of a mapping specification 150 to form a Teams table. The table tags 152 specify that the name of the output table is "TEAMS". The Teams table is to be formed with separate columns for conference data, division data, name data, and abbreviation data. With reference to both FIGS. 3 and 4, the XML data structure 100 is examined to determine where in the XML hierarchy the various data items to form the desired table are located. The mapping specification 150 via XPath locators identify the location where the team data is located in the XML data structure 100. For example, the XPath locator for the teams data is shown at 154 in an XPath specification format. The XPath specification 154 is enclosed within the table_xpath tags 156. The table_xpath tags indicate that a new observation in the output table is to be generated each time a <TEAM> element tag is processed.

The mapping specification 150 is supplemented with column definitions for the desired output Teams table. Column tags within the mapping specification 150 indicate what columns the output table will contain. Column tags 160 indicate the "name" column is to be formed, and they enclose information to form the "name" column. The enclosed information includes: XPath tags 162 to locate the name information within the XML data structure 100; type tags 164 and data type tags 166 to indicate what type the name values will be; and length tags 168 to indicate the variable size. The type for the "name" column is character, and the data type is string. The maximum length of the string within the column is thirty characters. It is noted that the XPath specification within the XPath tags 162 reflects that "name" is an attribute within the XML data structure 100.

Column tags 170 indicate the "abbrev" column is to be formed, and they enclose information to form the "abbrev" column. The enclosed information includes: XPath tags 172 to locate the abbreviation information within the XML data structure 100; type tags 174 and data type tags 176 to indicate what type the abbreviation values will be; and length tags 178 to indicate the variable size. The type for the "abbrev" column is character, and the data type is string. The maximum length of the string within the column is three characters. It is noted that the XPath specification within the XPath tags 172 reflects that "abbrev" is an attribute within the XML data structure 100.

Certain output columns add information about other output column entries, such as foreign keys or external context. Conference column tags 180 and division column tags 190 specify that such supplemental information is to be placed in the output table. Column tags 180 indicate the "conference" column is to be formed, and they enclose information to form the "conference" column. The enclosed information includes: XPath tags 182 to locate the conference information within the XML data structure 100; type tags 184 and data type tags 186 to indicate what type the conference values will be; and length tags 188 to indicate the variable size. The type for the "conference" column is character, and the data type is string. The maximum length of the string within the column is ten characters. It is noted that the XPath specification within the XPath tags 182 reflects that "conference" is a pcdata field within the XML data structure 100.

Column tags 190 indicate the "division" column is to be formed, and they enclose information to form the "division" column. The enclosed information includes: XPath tags 192 to locate the division information within the XML data structure 100; type tags 194 and data type tags 196 to indicate what type the division values will be; and length tags 198 to indicate the variable size. The type for the "division" column is character, and the data type is string. The maximum length of the string within the column is ten characters. It is noted that the XPath specification within the XPath tags 192 reflects that "division" is a pcdata field within the XML data structure 100.

Both the conference column tags 180 and division column tags 190 include a retain attribute. When the retain attribute is set to "YES", it forces the retention of processed data values after an observation is written to the output data set. Because the foreign key fields occur outside the observation boundary (i.e., they are more sparsely populated in the hierarchical XML data than in the output data set), their values are retained for additional rows as they are encountered.

Application of the mapping specification 150 upon the data contained in the XML data structure 100 produces the tabular output 200 shown in FIG. 5. With reference to FIGS. 4 and 5, the output table 202 is labeled "Teams" as dictated by the mapping specification's table tags 152. The table 202 contains the conference column 204, division column 206, name column 208, and abbreviation column 210 as dictated by the mapping specification column tags 160, 170, 180 and 190. The data contained within the columns 204, 206, 208, and 210 reflect the data contained within the input XML data file.

It should be understood that while this example includes only string values, the mapping specification can handle any type of value (including user-defined data types). For example, FIGS. 6-8 depict processing an XML data structure 250 having date fields.

With reference to FIG. 6, the XML data structure 250 contains data about published books in a public library. The XML data structure 250 has publication title information, the date upon which the library acquired the publication, and the topic of the publication. The library tags 252 enclose data about the publications. The publication tags 254, 256, and 258 indicate that there are three publications within the library tags 252. Publication tag 254 has title tag 260 and acquisition date tag 262; publication tag 256 has title tag 264 and acquisition date tag 266; and publication tag 258 has title tag 268 and acquisition date tag 270. The publication tags 254, 256, and 258 also contain tags to indicate the topic of a book. Because a book may cover multiple topics, a publication tag may include multiple topic tags. For example, publication tag 256 includes a first topic tag 272 and a second topic tag 274. The publication entitled "Inside Visual C++" has a first topic "C" and a second topic "Reference". An attribute is included in the first topic tag 272 to indicate that the first topic is the major topic for the publication.

To convert the XML data into a rectangular format, a mapping specification is constructed. FIG. 7 shows an example of a mapping specification 300 to form a Publication table having separate columns for title data, acquisition date data, topic data, and major topic data. With reference to both FIGS. 6 and 7, the XML data structure 250 is examined to determine where in the XML hierarchy the various data items to form the desired table are located. The table tags 302 specify that the name of the output table is "Publication". The mapping specification 300 locates within the XML data structure 250 where the publication data items are located. The table_xpath tags 306 contain this location information at 304 in an XPath specification format.

The mapping specification 300 is supplemented with the column definitions for the desired output Publication table. Column tags (310, 320, 330, and 340) within the mapping specification 300 indicate what columns the table will contain. Column tags 310 indicate the "Title" column is to be formed, and they enclose information to form the "Title" column. The enclosed information includes: XPath tags 312 to locate the name information within the XML data structure 250; type tags 314 and data type tags 316 to indicate what type the Title values will be; and length tags 318 to indicate the variable size. The type for the "Title" column is character, and the data type is string. The maximum length of the string within the column is nineteen characters.

Column tags 320 indicate the "Acquired" column is to be formed, and they enclose information to form the "Acquired" column. The enclosed information includes: XPath tags 322 to locate the acquisition date information within the XML data structure 250; type tags 324 and data type tags 326 to indicate what type the date values will be; and length tags 327 to indicate the variable size. The type for the "Acquired" column is numeric, and the data type is float. Format tags 328 indicate for the output a width of ten and a "mmddyy" format. The informat tags 327 specify the input format for the field. The field is constructed using format/informat controls of the mapping specification. These controls are useful for situations where data (such as dates) must be converted for use by the system. User written formats and informats are supported, and they may be used independently of each other.

Column tags 330 indicate the "Topic" column is to be formed, and they enclose information to form the "Topic" column. It is noted that in this example a publication data item may enclose an arbitrary number of topics. The publication tags 254 enclose one topic data item, while publication tags 256 enclose two topic data items. A new observation is generated in the output each time a <topic> element is encountered in the input file. The information enclosed by tags 330 includes: XPath tags 332 to locate the topic information within the XML data structure 250; type tags 334 and data type tags 336 to indicate what type the topic values will be; and length tags 338 to indicate the variable size. The type for the "Topic" column is character, and the data type is string. The maximum length of the string within the column is nine characters.

Column tags 340 indicate the "Major" topic column is to be formed, and they enclose information to form the "Major" topic column. The enclosed information includes: XPath tags 342 to locate the major topic information within the XML data structure 250; type tags 344 and data type tags 346 to indicate what type the major topic values will be; and length tags 346 to indicate the variable size. The type for the "Major" topic column is character, and the data type is string. The maximum length of the string within the column is one character. Enumerations are also located within the "Major" topic column tags 340. Here, the values expected of the major topic attribute must be either "Y" or "N" as shown by tags 352 and 354. Incoming data values not contained within the ENUM tags 350 are set to MISSING. The MISSING value is the default for data which does not occur in the input file processing unless specifically overridden by a non-MISSING default value as specified by a <DEFAULT> element (e.g., tag 356).

Both the Title column tags 310 and Acquired column tags 320 include a retain attribute. When the retain attribute is set to "YES", it forces the retention of processed data values after an observation is written to the output data set. Because the foreign key fields occur outside the observation boundary (i.e., they are more sparsely populated in the hierarchical XML data than in the output data set), their values are retained for additional rows as they are encountered.

Application of the mapping specification 300 upon the data contained in the XML data structure 250 produces the tabular output 370 shown in FIG. 8. With reference to FIGS. 7 and 8, the output table 372 is labeled "Publication" as dictated by the mapping specification's table tags 302. The table 372 contains the Title column 374, Acquired column 376, Topic column 378, and Major column 380 as dictated by the mapping specification column tags 310, 320, 330 and 340. The data contained within the columns 374, 376, 378, and 380 reflect the data stored within the input XML data file.

It should be understood that a mapping specification may contain multiple table tags so that multiple tables can be formed from the mapping specification. Each table specified in the mapping specification may have different table contents.

Figure 9:
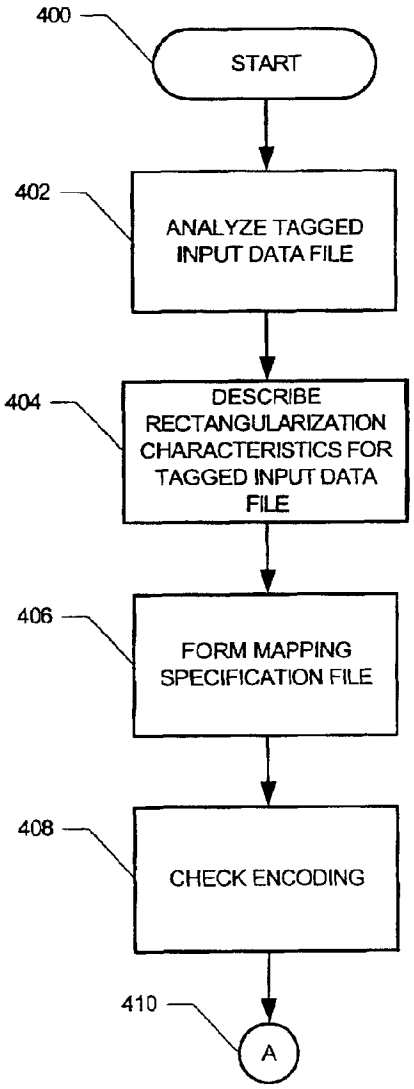
FIGS. 9-13 are flowcharts depicting an operational scenario for processing a tagged input data file.

FIGS. 9-13 are flowcharts depicting an operational scenario for processing a tagged input data file. With reference to FIG. 9, start indicator 400 indicates that at process block 402, a tagged input data file is to be converted. In this operational scenario, the graphical user interface is used to more easily discern what data items and data relationships are found within the tagged input data file. With this knowledge, a user describes the rectangularization characteristics for the input tagged data file. This description which is to form the mapping specification involves identifying what tables are to be generated from the tagged input data file. Repeating patterns for the data are also identified as well as the output table's column definition. The user may also wish to add any foreign keys or external context. XPath locators are created in order to identify positions in the tagged input data file to extract the data.

Based upon the description of process block 404, the data directives are formed and stored in the mapping specification at process block 406. At process block 408, the encoding contained in the mapping specification is checked to ensure that the encoding of the mapping specification conforms to the data hierarchy of the input tagged data file. Processing continues on FIG. 10 as indicated by continuation block A.

Figure 10:
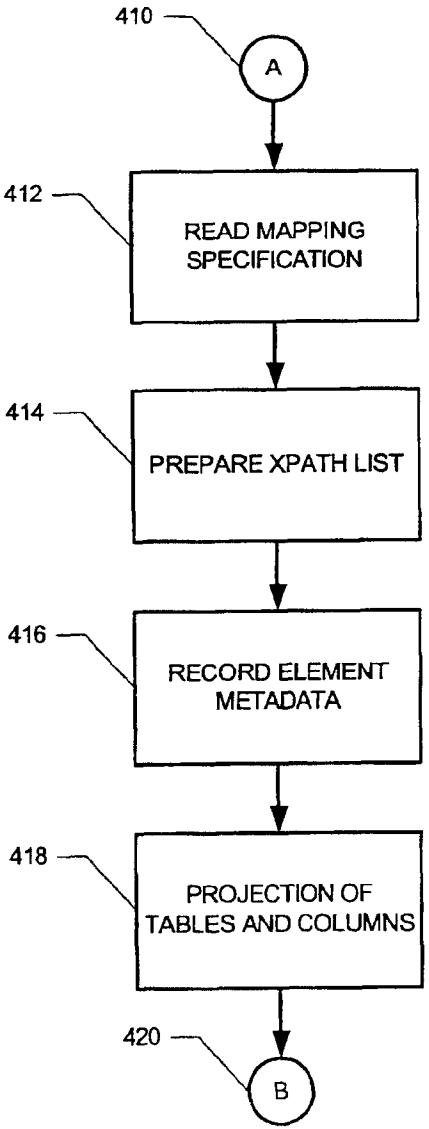

With reference to FIG. 10, the mapping engine reads the mapping specification and prepares at process block 414 the XPath list. The XPath list is prepared in order to specify what data items are to be extracted from the tagged input data.

At process block 416, the element metadata is recorded in order to collect and properly convert data types from source to destination formats, align column length and prioritize data buffering for projection. At process block 418, the tables and columns are projected in order to provide a data storage location as observations are created from the tagged input data file. Processing continues at process block 422 as indicated by the continuation block 420.

Figure 11:
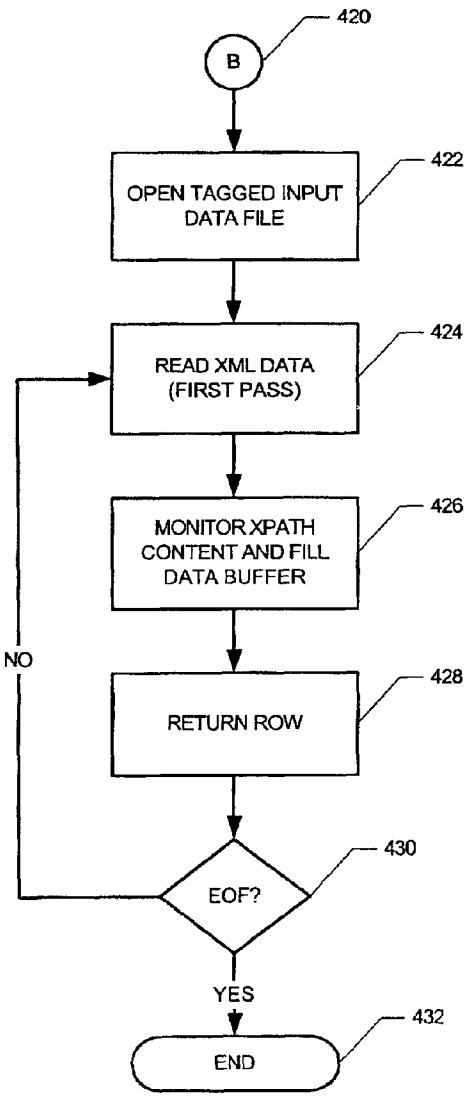

With reference to FIG. 11, process block 422 opens the input tagged data file and process block 424 reads the XML data in its first pass through the tagged input data file. The XPath content is monitored and its data buffer is filled with the data from the input tagged data file that corresponds to the XPath specifications. Process block 428 returns a row after the data buffer has been filled in a pass through the tagged input data file. If the end of the input tagged data file has not been reached, then processing returns to process block 424 so that additional XML data from the input file may be read and subsequently processed by process block 426 and 428. However, if the end of the file has been reached, then processing terminates at end block 432. It is noted that a first pass may be used to build the map (e.g., to collect the data types, such as date, strings, etc.). A second pass may then be used to complete the process to construct the output observations. However, it should be understood that one or any number of passes may be used to map and to generate output observations.

Figure 12:
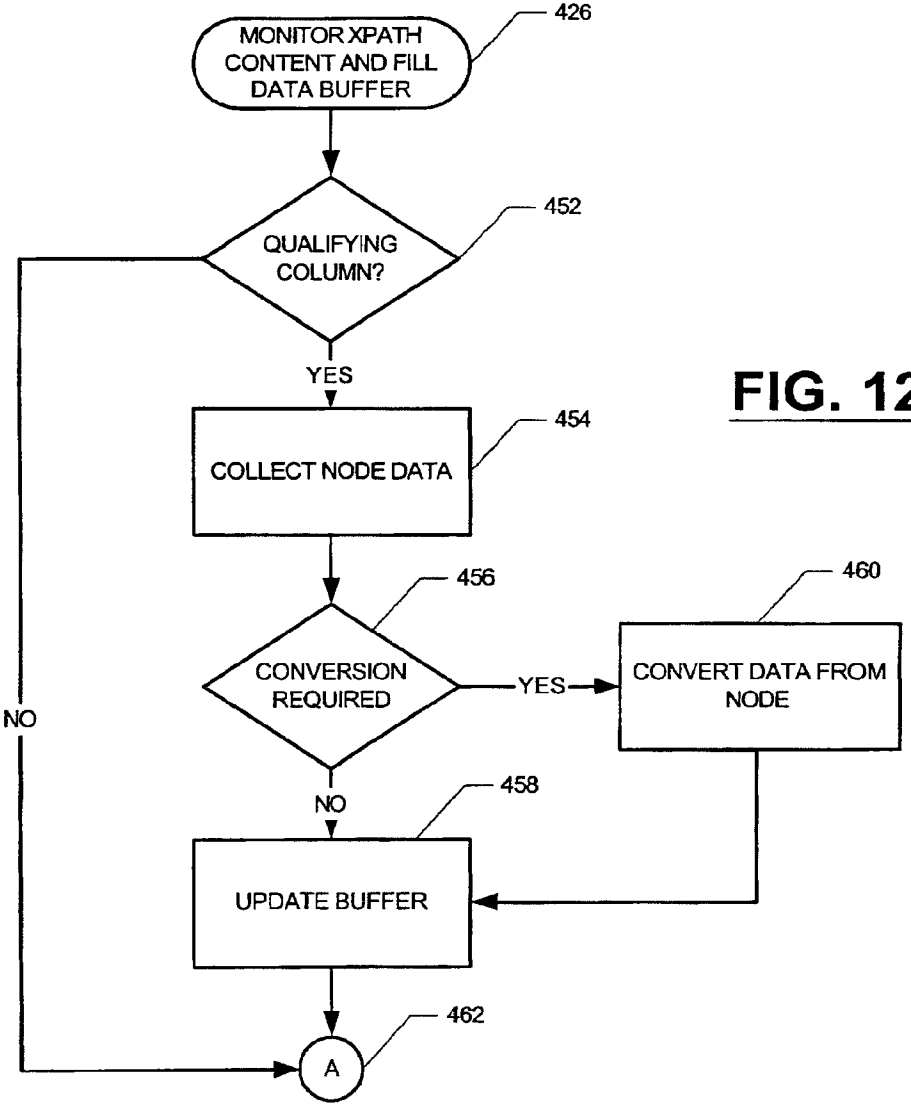
Figure 13:
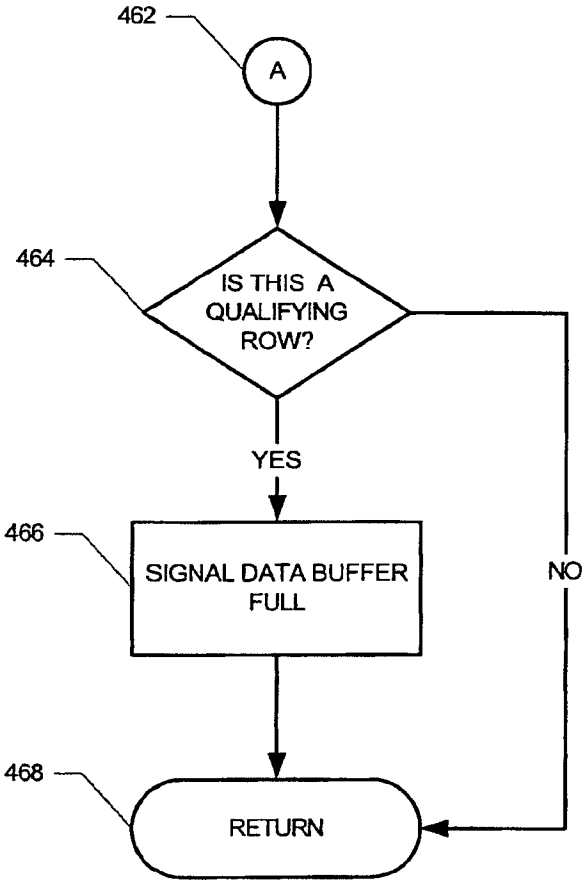

FIGS. 12 and 13 depict flowcharts that describe in greater detail process block 426 wherein the XPath content is monitored and the data buffer is filled. With reference to FIG. 12, decision block 452 examines if an XML node qualifies as containing data needed for creating the output table. If it does qualify, then process block 454 collects the XML node data, and decision block 456 examines whether conversion is required for the node data. If conversion is required (e.g., to convert a date value to a different format), then the data from the node is converted at process block 460 and processing continues at 458. If conversion is not required for the node data as determined by decision block 456, then process block 458 is executed wherein the buffer is updated to reflect the collected node data. Processing continues at the continuation indicator 462 either after the buffer has been updated by process block 458 or after decision block 452 has determined that this was not a qualifying XML node. Processing continues on FIG. 13 as indicated by the continuation indicator 462.

With reference to FIG. 13, decision block 464 examines whether an XML node contains data that qualifies as a new row (e.g., it examines whether it is a table XPath tag). If it does not, then processing returns via the return block 468. However if it does, then process block 466 signals that the data buffer is full before allowing the processing to return to the calling program at return block 468.

Figure 14:
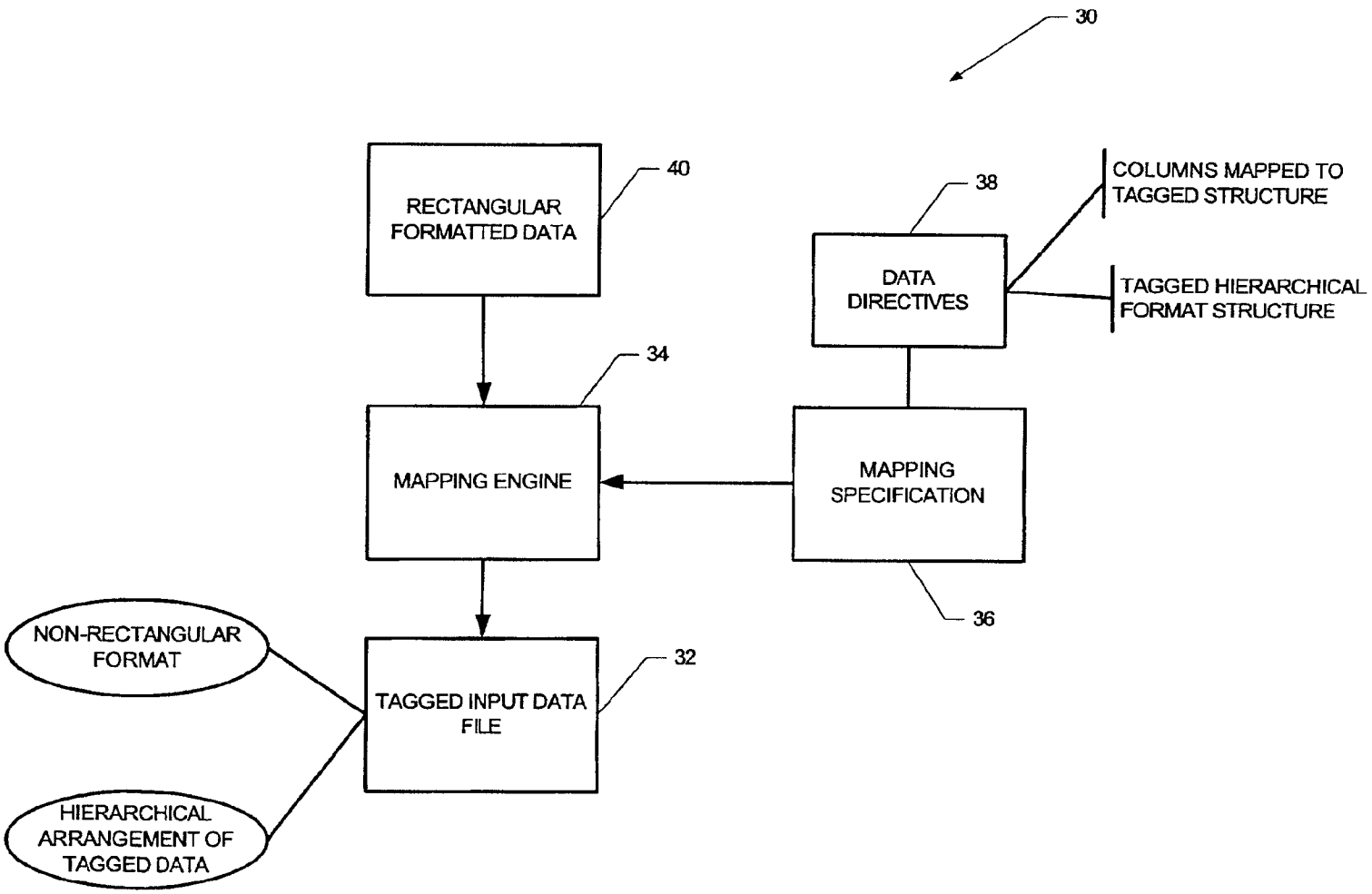
FIG. 14 is a block diagram depicting software and computer components utilized in processing rectangular formatted data.

FIG. 14 depicts a different embodiment of the system 30 wherein rectangular formatted data is converted into a tagged input data file 32. In this way, software applications that converse through tagged data formats can access the rectangular formatted data 40 through the created tagged input data file 32.

During the conversion process, the mapping specification 36 dictates how the columnar data interrelate with each other. This may include specifying hierarchical relationships for the data items contained in the rectangular formatted data 40. The data directives may also differentiate between which rectangular data items are pcdata fields and which are attributes. For example, to create a tagged input data file filled with NHL team data, the data items in a team column would be specified in the data directives 38 as being subordinate in the tagged data hierarchy to the data items in the division column. Moreover, the team names and abbreviation data items would be specified in the data directives 38 as creating attributes for team element fields.

The mapping engine 34 uses the data directives 38 stored in the mapping specification 36 to generate the tagged input data file 32 based upon the rectangular formatted input data 40. In this way, the system 30 is able to go back and forth automatically between the two data formats. Exemplary applications utilizing this interchangeability are shown in FIGS. 15 and 16.

Figure 15:
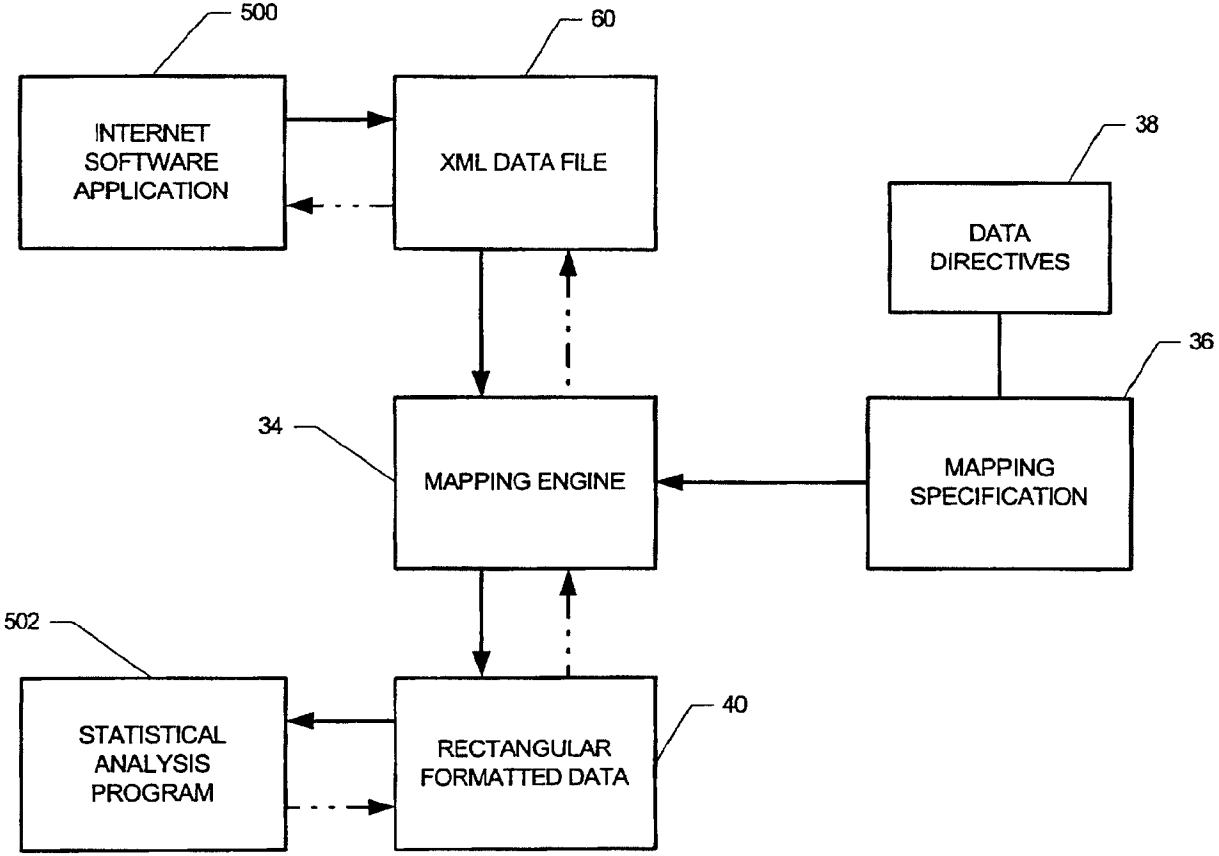
FIGS. 15 and 16 are block diagrams depicting exemplary applications involving tagged and rectangular data processing.
Figure 16:
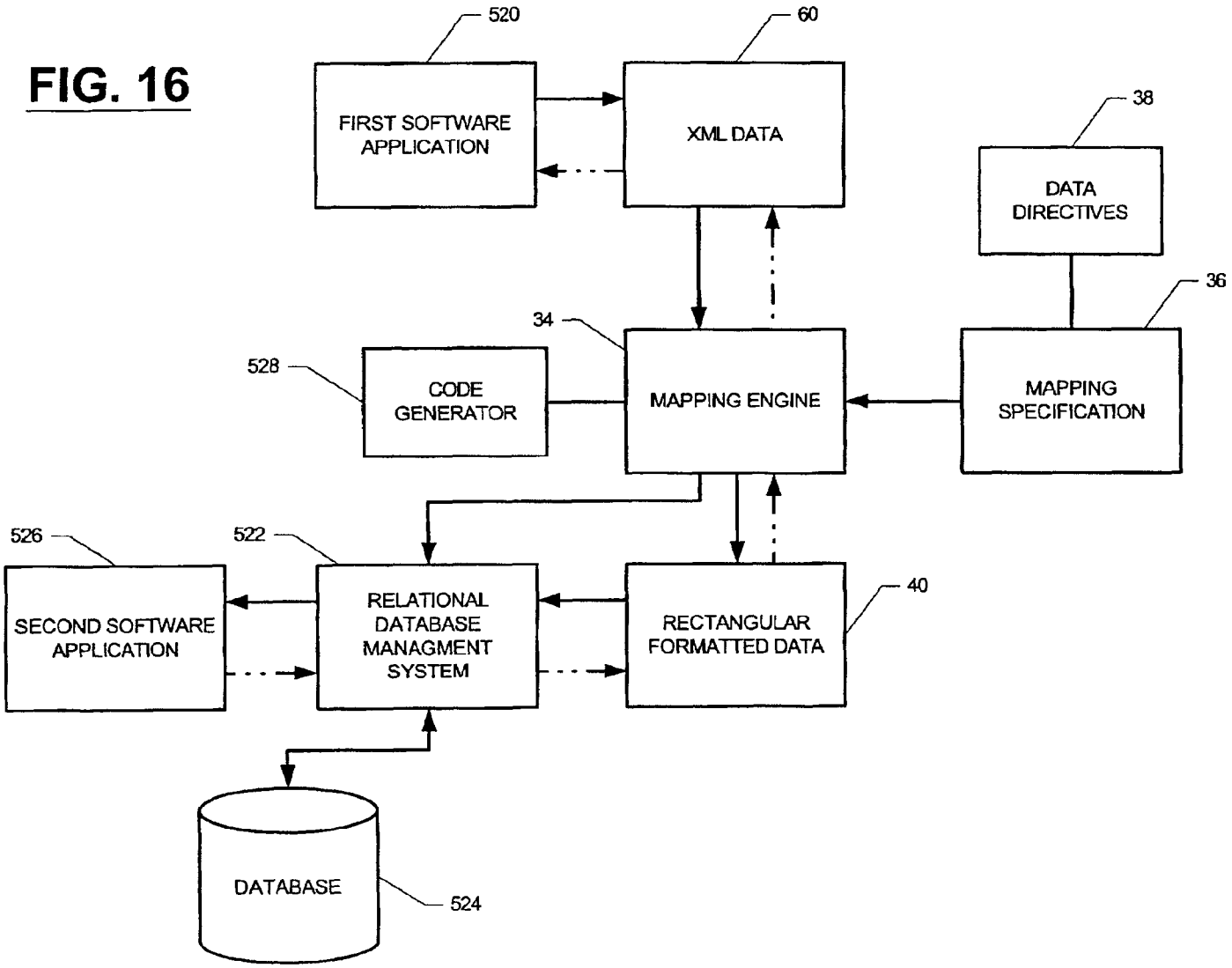

FIG. 15 depicts an Internet software application 500 being conversant only with XML formatted data 60. The Internet software application 500 may present a survey questionnaire to users regarding certain products. The compiled survey results are stored by the Internet software application 500 in the XML data file 60 so that the results may be analyzed through a sophisticated statistical analysis program 502.

Because the statistical analysis program 502 reads data sets in a rectangular format, the mapping engine 34 must act as a "go between" for the Internet software application 500 and the statistical analysis program 502. The mapping specification 36 contains data directives 38 to parse content from the XML data file 60 and format the parsed content into rectangular formatted data 40. The rectangular formatted data 40 is then analyzed by the statistical analysis program 502.

The statistical analysis program 502 may also wish to communicate all or a portion of its analysis back to the Internet software application 500. For example, the Internet software application 500 may wish to show a user how the user compared statistically to other users in answering the survey questionnaire. To accomplish this, the statistical analysis program 502 first generates its analysis as rectangular formatted data 40. The mapping engine 34 then utilizes the mapping specification 36 to specify how an XML data file 60 is to be created from the rectangular formatted data 40. The created XML data file 60 containing the analysis results is then provided to the Internet software application 500.

FIG. 16 depicts another application where a first software application 520 wishes to interact with a relationship database management system 522 (possibly to persist its information). However, the first software application 520 converses only through XML data 60 (which is not compatible with the input rectangular data format for the relational database management system 522). The mapping engine 34 parses and converts the XML data 60 from the first software application into rectangular formatted data 40. The relational database management system 522 imports the rectangular formatted data 40 into a table within database 524. The imported data is then accessible by other applications, such as a second software application 526.

The second software application 526 may also store its own information in the database 524. The first software application 526 may wish to access the information stored by the second software application 526. To effect this access, the stored information may be exported through the relational database management system 522 as rectangular formatted data 40. The mapping engine 34 utilizes the mapping specification 36 to create for the first software application XML data 60 based upon the rectangular formatted data 40. In this way, bi-directional data communication is achievable between two or more applications having different data formats.

The mapping engine 34 may also use a code generator 528 to generate structured query language (SQL) commands. The SQL commands may create tables within the RDBMS 522 based upon the mapping specification 36. The code generator 528 may also generate SQL insert commands to insert columnar data into the created tables. It should be understood that the mapping engine 34 may be used with many different types of code generators 528. For example, a code generator may create instructions to create datasets within a statistical software application and then populate the datasets with data from the input XML data 60. The generated code could also contain instructions to execute statistical programs to analyze the populated datasets.

While examples have been used to disclose the invention, including the best mode, and also to enable any person skilled in the art to make and use the invention, the patentable scope of the invention is defined by the claims, and may include other examples that occur to those skilled in the art. For example, the data directives may include many functions to indicate how input data (whether tagged or rectangular) is be processed. This may include XPath specifications for axes in order to access data that is less tightly tied to true hierarchical arrangement structures or any other non-rectangular design characteristics and input file may contain.

Other exemplary functions include XML node set functions for such operations as: returning the namespace URI (where URI stands for uniform resource identifier) of the expanded-name of the node; returning the expanded-name of the node; returning a number equal to the current parsing line; returning a number equal to the offset position into the current parsing line; or returning the namespace prefix of the expanded-name of the node. Still further, other functions may include such string functions as described in FIGS. 17-19D.

FIG. 17 depicts an XML data structure 600 whose NHL team data is to be parsed via the mapping specification 620 of FIGS. 18A-18D.

FIGS. 18A-18D show a sample mapping specification that creates a table for different string functions. The mapping specification 620 includes table tags 630 to generate a table entitled "concat". The generated table "concat" is shown in FIG. 19A at 750. The columns of table 750 illustrate different concatenations performed by the functions contained within the table tags 630. The first column demonstrates a concatenation postfix where a string is appended to an input XML data item; the second column depicts a concatenation prefix where a string is prefixed to an input XML data item; and the third column depicts both a prefix and a postfix concatenation.

With reference back to FIG. 18A, the mapping specification 620 includes table tags 640 to generate a table entitled "starts-with". The generated table "starts-with" is shown in FIG. 19A at 760. The column of table 760 shows the boolean results of testing whether an input XML team data item (from FIG. 17) starts with a particular string (which in this example is the string "new york").

With reference to FIG. 18B, the mapping specification 620 includes table tags 650 to generate a table entitled "contains". The generated table "contains" is shown in FIG. 19A at 770. The column of table 770 shows the results of testing whether an input XML data item contains a particular string (which in this example is the string "new").

With reference back to FIG. 18B, the mapping specification 620 includes table tags 660 to generate a table entitled "substring-before". The generated table "substring-before" is shown in FIG. 19B at 780. The column of table 780 shows what string occurs in an input XML data item before the string "york". Note that selected data which does not contain the pattern string returns a blank/MISSING value. This behavior may be subsequently altered by having the column definition contain <DEFAULT> and/or <ENUM> elements. With reference back to FIG. 18B, the mapping specification 620 includes table tags 670 to generate a table entitled "substring-after". The generated table "substring-after" is shown in FIG. 19B at 790. The column of table 790 shows what string occurs in an input XML data item after the string "york". Note that selected data which does not contain the pattern string returns a blank/MISSING value. This behavior may be subsequently altered by having the column definition contain <DEFAULT> and/or <ENUM> elements.

With reference to FIG. 18C, the mapping specification 620 includes table tags 680 to generate a table entitled "substring". The generated table "substring" is shown in FIG. 19C at 800. The first column of table 800 shows for each input XML data item what characters appear as the first five characters; the second column of table 800 shows for each input XML data item what characters appear in the fifth character position and on; and the third column of table 800 shows for each input XML data item what characters appear in the fifth through eighth character positions.

With reference back to FIG. 18C, the mapping specification 620 includes table tags 690 to generate a table entitled "string-length". The generated table "string-length" is shown in FIG. 19C at 810. The column of table 810 shows the string length of each input XML data item.

With reference to FIG. 18D, the mapping specification 620 includes table tags 700 to generate a table entitled "normalize". The generated table "normalize" is shown in FIG. 19D at 820. The column of table 820 shows each input XML data item having any extraneous spaces (i.e., duplicate ASCII code 32 characters appearing between words) in its string removed.

With reference back to FIG. 18D, the mapping specification 620 includes table tags 710 to generate a table entitled "translate". The generated table "translate" is shown in FIG. 19D at 830. The first column of table 830 shows the original input XML data item; and the second column of table 830 shows results of a character search and replace operation (where the string "New" in the input XML data item was replaced with the string "Old"). However, note that this is character-for-character, global scope, replace operation. Thus the character "N" was replaced with the character "O"; the character "e" was replaced with the character "l"; and the character "w" was replaced with the character "d".

Figure 20:
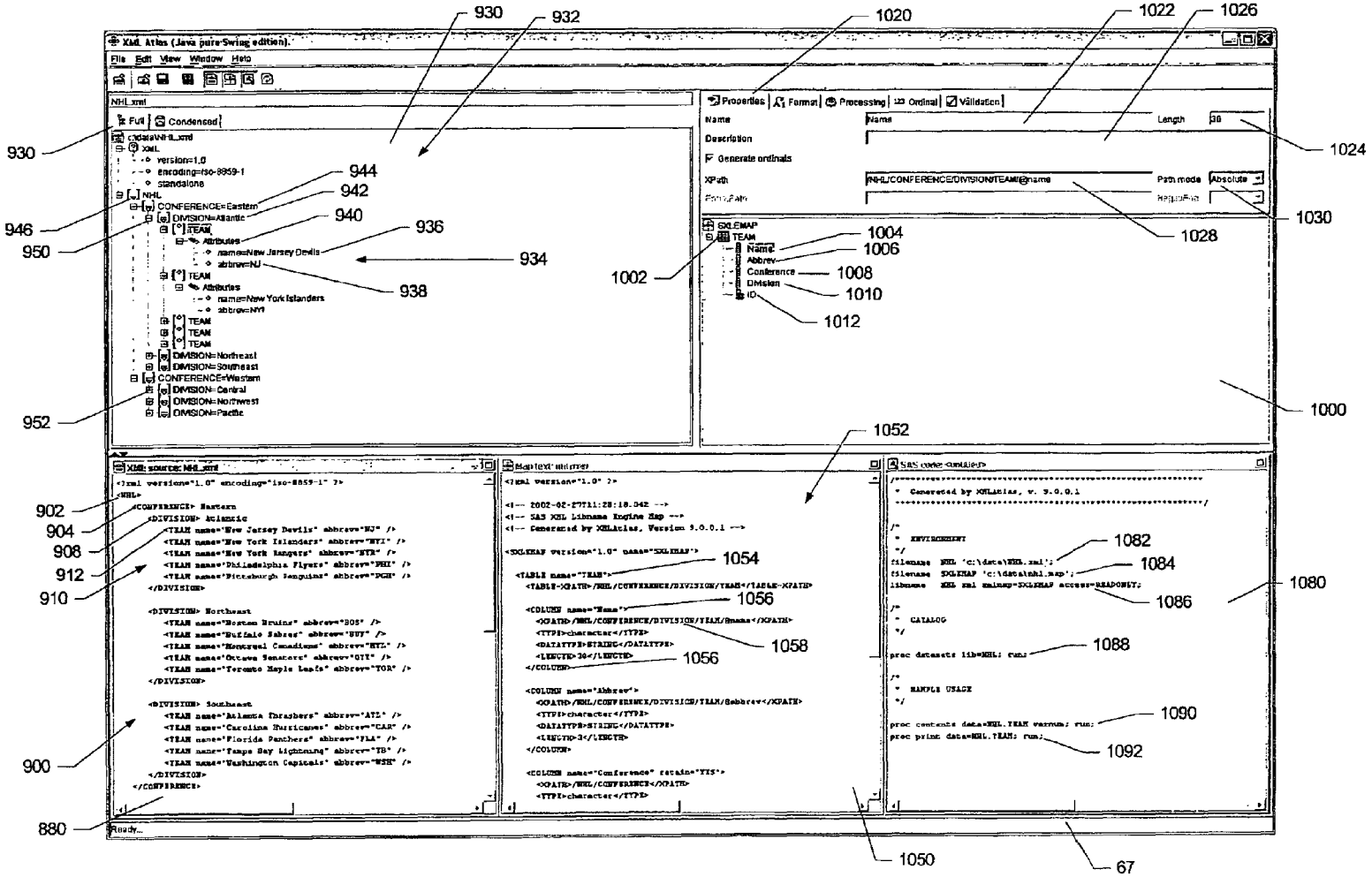
FIGS. 20-24 depict graphical user interfaces for processing tagged data files and rectangular formatted data.

A graphical user interface 67 may help a user create mapping specifications as shown in FIGS. 20-24. FIGS. 20-24 depict a graphical user interface 67 for processing tagged formatted data and rectangular formatted data. FIG. 20 depicts an exemplary interface 67 for creating a mapping specification from tagged input data. In this example, input XML data items 900 are shown within interface region 880. The XML data items 900 contain tagged hierarchical data about NHL conferences, divisions, and teams.

For example, NHL tags 902 enclose NHL conference, division, and team data as well as their data relationships. Conference tags 904 contain Eastern Conference data. Division tags 908 contain Atlantic Division data. Name and abbreviation attributes within team tags 910 provide the names and abbreviations of teams within the Atlantic Division. For example, team tag 912 contains the name attribute "New Jersey Devils" and the team abbreviation attribute "NJ".

Interface region 930 displays for the convenience of the user either a full or condensed hierarchical view of the XML data items 900. In the full view, the hierarchy of the XML data items 900 and their values are displayed. For example, the team tag 912 that depicts information about the New Jersey Devils is represented within the hierarchy 932 at 934. More specifically, the team name attribute "New Jersey Devils" is shown within the hierarchy 932 at 936, and the abbreviation "NJ" is shown at 938.

As shown by the indented hierarchy 932, the New Jersey Devils' attributes 940 are contained within the Atlantic Division 942 which is within the Eastern Conference 944. The Eastern Conference 944 is contained within the NHL indicator 946.

The user may expand or collapse the hierarchy 932 to show as much detail as the user desires. Indicators show the user whether a hierarchical data element is in a collapsed or expanded state. For example, a fully expanded indicator is shown at 950 to indicate that all of the data associated with the Atlantic Division is shown, while the data hierarchy for the Central Division may still be expanded as indicated by the expansion indicator 952.

In order to create a mapping specification for the input XML data 900, interface region 1000 allows the user to specify which data items within the input XML data 900 are to be a data source for the columns of rectangular formatted data. Within interface region 1000, the user creates a table which in this example is shown at 1002 and is labeled "TEAM". The user specifies the columns the table is to have. In this example, the team table 1002 contains a name column 1004, abbreviation column 1006, conference column 1008, division column 1010, and identification column 1012.

The interface region 1000 allows the user to select a column so that properties, formatting and other information associated with a column may be specified. In this situation, the name column 1004 is selected. With the properties tag 1020 selected, a user may specify or modify the name of the column within field 1022 as well as length at 1024 and a description of the column at 1026. The user may also specify the XPath value at field 1028 so that the team name data may be located within the raw XML data 900. The user may analyze the XML data hierarchy through the interface region 930 to more easily determine the proper XPath specification. The user may select at 1030 whether the XPath specification is in an absolute or relative mode.

Interface region 1050 depicts a mapping specification 1052 that has been generated based upon the information provided by the user through the interface region 1000. The mapping specification 1052 contains XML data item tags 1052 that have been generated through interface region 1000. For example, the XML data items tags 1052 contain a table tag 1054 that specifies that a table is to be created labeled "TEAM". This tag was generated in accordance with the user having specified the table name through interface region 1000 at 1002.

Also in accordance with the information specified through interface 1000, data item tags were generated at 1056 that is to create a name column. An XPath data item tag 1058 within tags 1056 specifies the source of the information for this column. The XPath specification value contained within the XPath data item tag 1058 is in accordance with the XPath information supplied through interface 1000 at 1028.

Interface region 1080 shows generation of code that is to create rectangular formatted datasets based upon the mapping specification 1052. In other situations, code may also contain other types of instructions, such as structured query language (SQL) instructions. Such SQL instructions may be used to create and insert data within a relational database management system.

The code within interface region 1080 indicates the source of data and the statistical procedures to analyze the data. The code contains at 1082 the instructions to access files with the input data: the instruction that indicates the location of the input XML information is shown at 1082; the instruction that indicates the location of the NHL mapping specification is shown at 1084; and the instruction to access a library is specified at 1086. In this example, the library performs the following: definition of reference name for the library, processing being assigned to and conducted by the XML libname engine, a binding of the XMLMap definition to the XML input file and engine assignment, and an access setting of READONLY (non-update) on the input XML file.

At instruction 1088, a procedure is automatically executed to process the data contained within the input XML file in accordance with the XML mapping specification. Instructions 1090 and 1092 depict exemplary usages of the input data, such as performing statistical analyses at instruction 1090 and printing out the results at instruction 1092.

Figure 21:
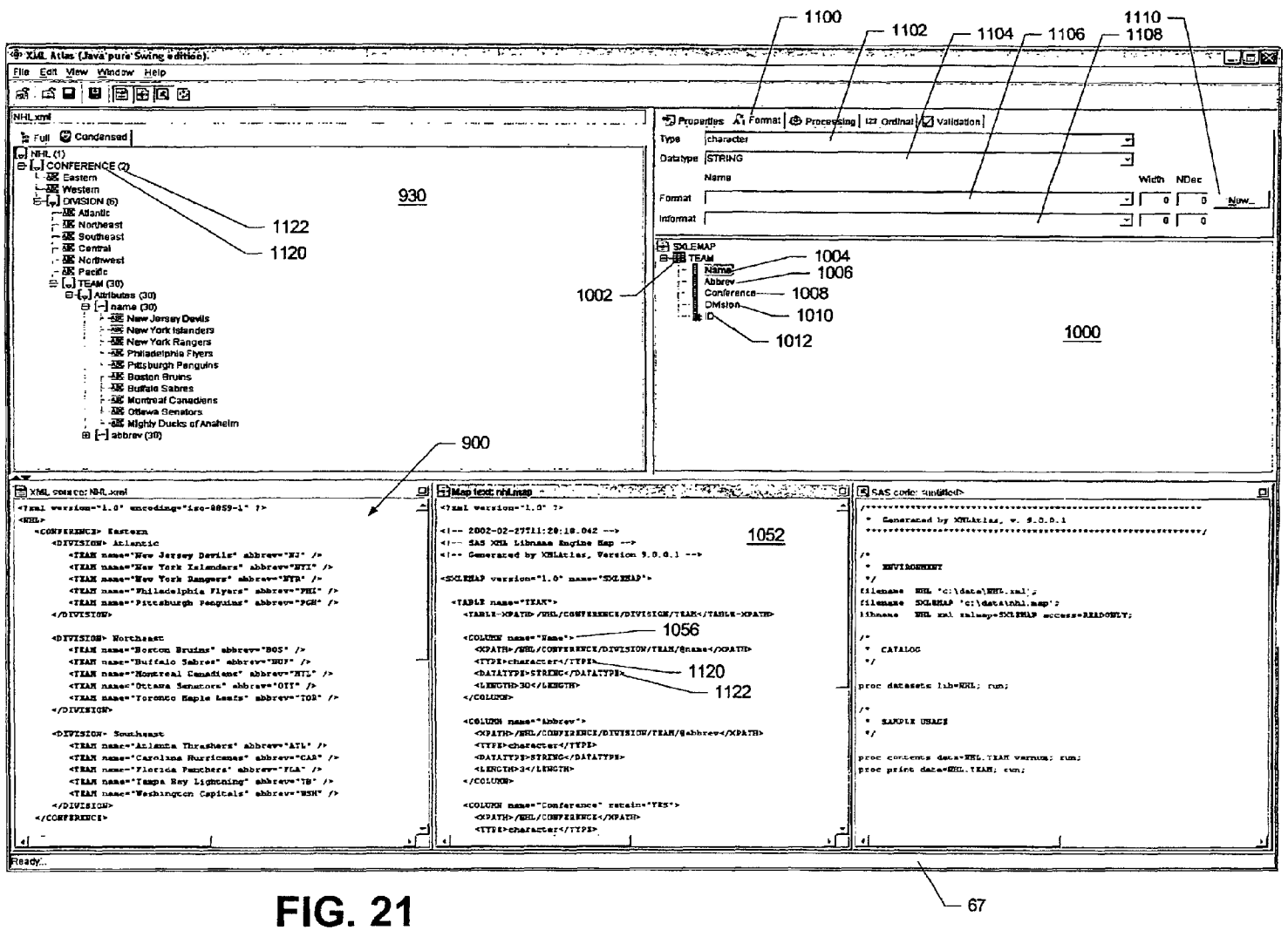

FIG. 21 shows an example where the name column 1004 and the format column tab 1100 have been activated so that the user may specify the format of a column. By activating the format column tab 1100, a user can specify such formatting items as the type, data type, format, informat, or even a new type of format as shown at 1110. In this situation, the user has specified that the name column 1004 has a character type and a string data type. Specification of this information through interface 1000 is used to create mapping specification information. This information is reflected within the mapping specification 1052 at tags 1120 and 1122. Type tags 1120 specify as a data directive that the column name 1056 has a character type. This is in accordance with the user having specified such a type at type field 1102. Similarly, the data type tags 1122 specify that the name column has a data type of string in accordance with the data type field 1104 within interface 1000.

The graphical user interface 67 also shows a condensed view of the input XML data within interface region 930. The condensed view shows the unique values an element has. For example, the conference element 1120 shows underneath it the unique values that the conference element has (i.e., Eastern and Western conference values). The fact that the conference element contains two unique values is shown by the number "2" located at 1122.

Figure 22:
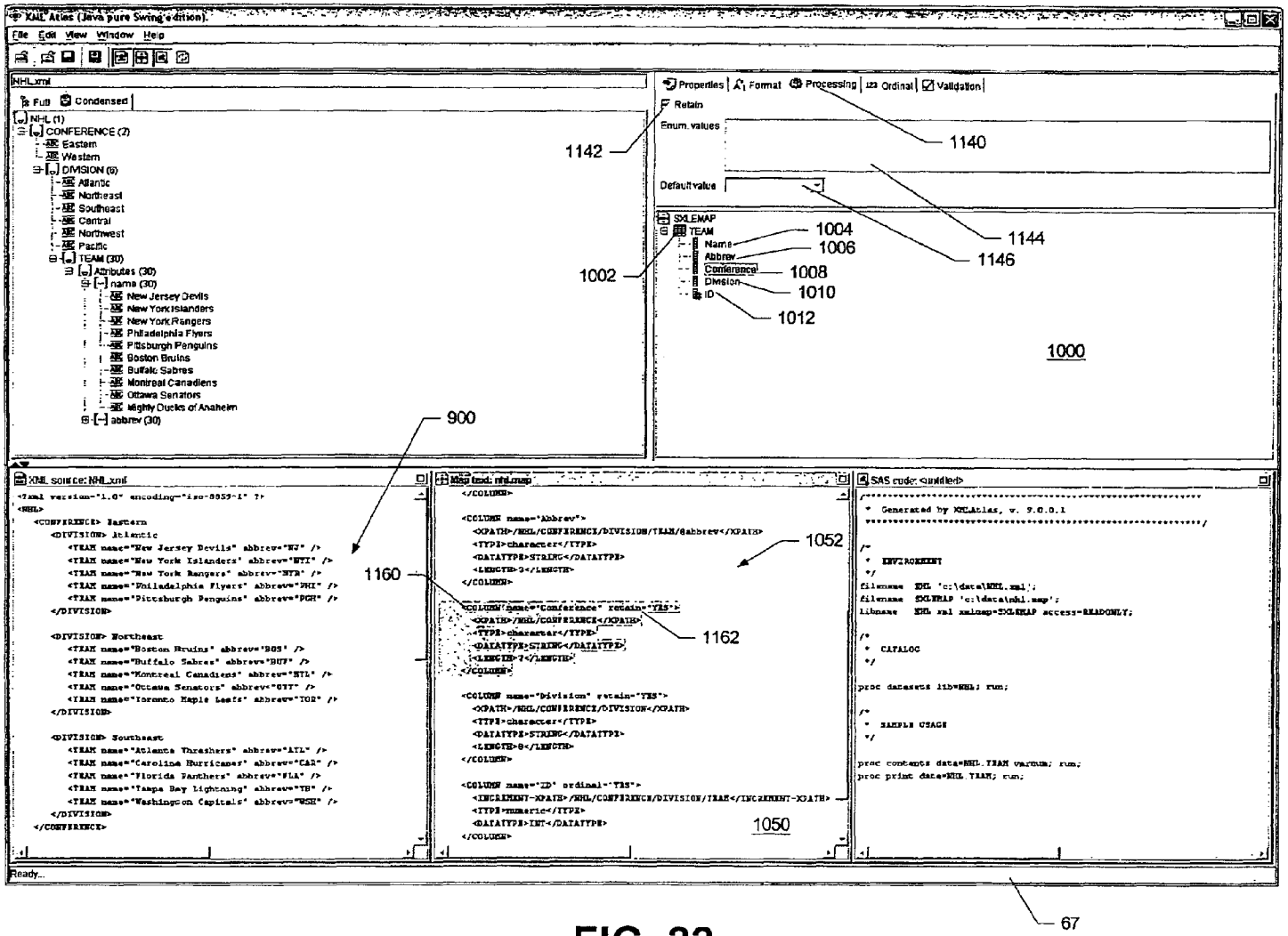

FIG. 22 depicts a graphical user interface 67 where the conference column 1008 and the processing tab 1140 have been activated. Within interface region 1000, the user may specify whether the conference values contained within the XML data 900 are to be retained as shown by check box 1142. The user may choose to enumerate values for the conference column 1008 within field 1144 and/or specify a default value at field 1146 for when a conference value is missing.

Data directives are created and placed within the mapping specification 1052 in accordance with the information provided through interface 1000 for the conference column 1008. For example, the data directive that the conference values are to be retained is shown within conference column tag 1160 at 1162.

Figure 23:
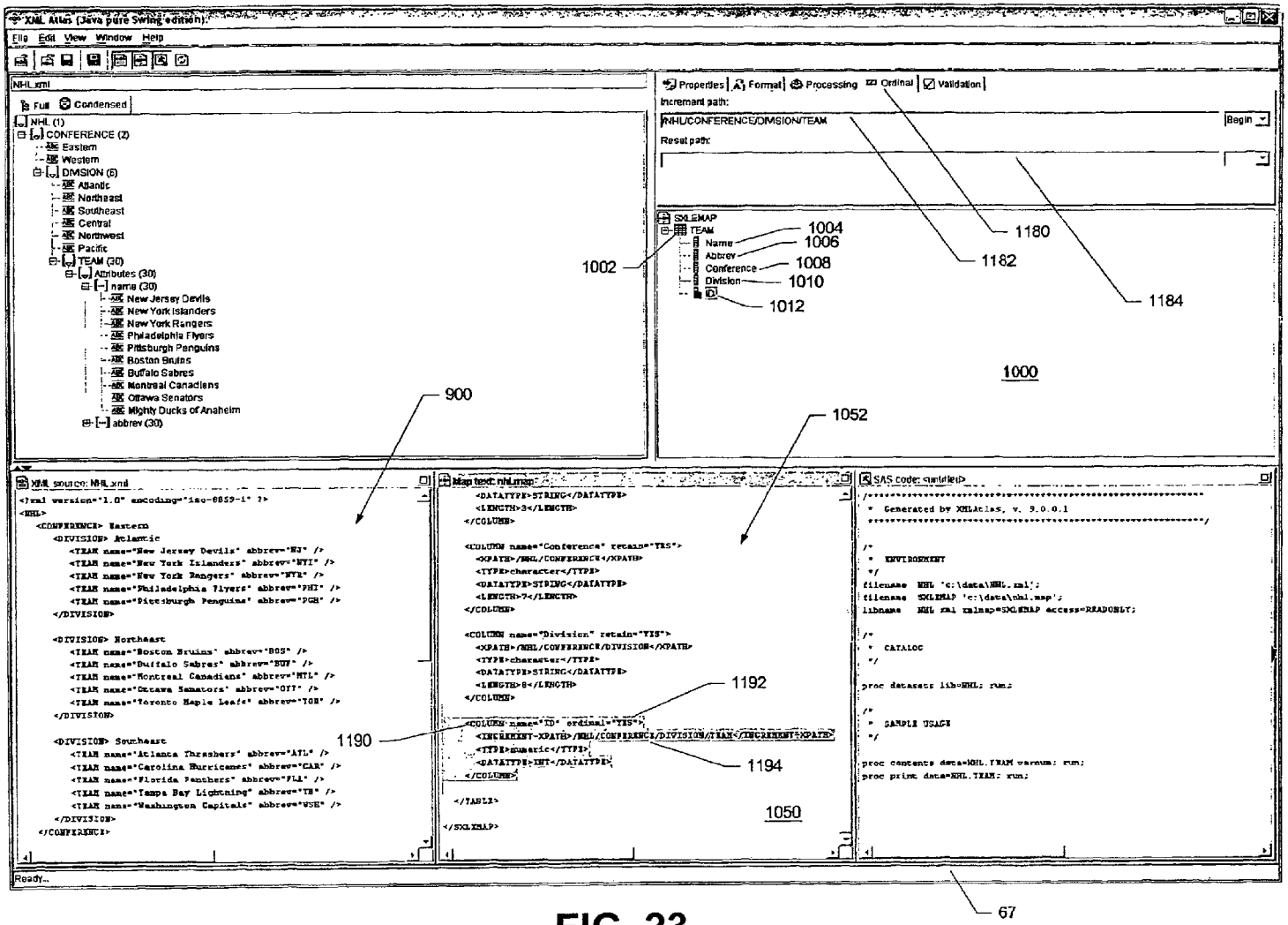

FIG. 23 shows an example where the identification column 1012 and the ordinal tab 1180 are activated. The ordinal tab 1180 is used to indicate that a column's value is to be incremented. In this situation, the user has specified through the increment path at field 1182 how values within this column are to be incremented. The increment path field 1182 indicates that the identification number is to be incremented whenever a new team value is found within the XML data 900.

For the mapping specification 1052, data directives are generated based upon the information supplied through interface 1000 so that the identification column may be provided with proper increment values. Identification column tag 1190 of the mapping specification 1052 specifies that this column is to be incremented as shown at 1192. This increment data directive is set in the mapping specification at 1194 in accordance with the increment path specified at 1182. It is noted that at 1184 a user may specify when an increment value is to be reset.

Figure 24:
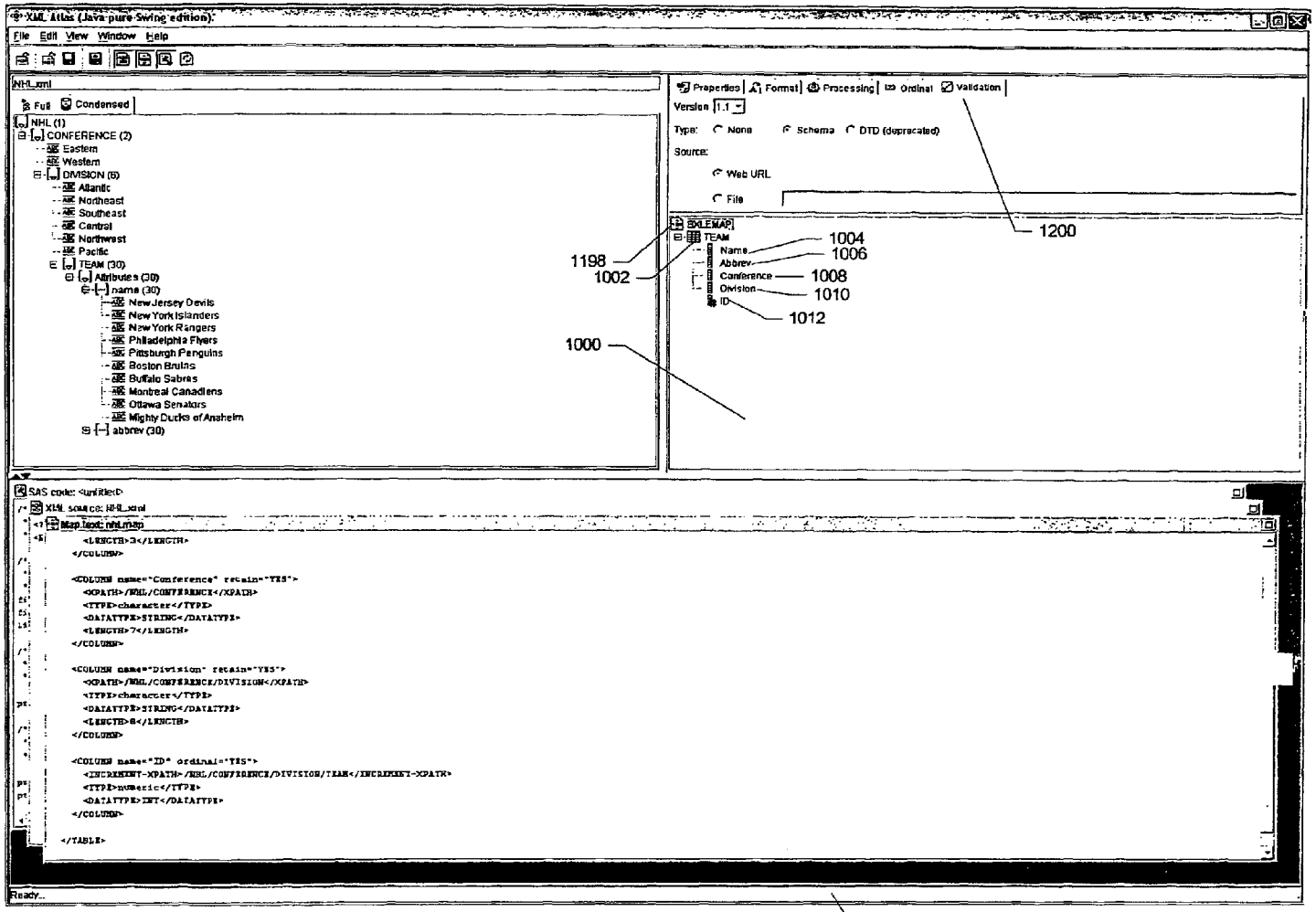

FIG. 24 shows where the SXLEMAP indicator 1198 and the validation tab 1200 have been activated. The SXLEMAP indicator 1198 is used to denote all the tables that are to be constructed. It should be understood that while this example shows one table being processed, the graphical user interface 67 may be used to designate and construct multiple tables within interface region 1000 at the same time.

Selection of the validation tab 1200 allows a user to validate one or more aspects of the table(s) to be constructed. For example, the user may specify that the schema for the table(s) shown within interface 1000 is to be validated with respect to the input XML data. It should be understood that other types of validation may be performed, such as "DTD" (deprecated) which allows the following to be done: tag name conventions, tag order validation, and appropriate attribute usage.

The user may also designate the source as either a web uniform resource locator (URL) or as a file. The user may do this in order to access a personal (or modified) copy of the validation file from a local file system should the user be unable to otherwise access a web-based URL, perhaps due to a corporate firewall restriction, etc.

It should be understood that the graphical user interface may be implemented in many ways, such as in separate windows within a window-based system, or as a series of web pages that a user may access, or through a number of other ways. Moreover, the graphical user interface can be utilized to accept rectangular formatted data as input. In this way, mapping specifications may be created to transform the input rectangular data into non-rectangular formatted data. Interface regions are used to show the raw input columnar data, the table structure and format, as well as interface regions to allow the user to designate the tagged data hierarchy. This information may then be used to construct and display a mapping specification that will transform the rectangular formatted input data into a tagged hierarchical format.

It is claimed:

1. A [computer-implemented method,] *system for transforming a first data file, including a hierarchically arranged tagged input data structure, to an output data structure in rectangular format, using a mapping specification in a second data file for use in a procedure, the system* comprising:

[receiving, using one or more processors, tagged input data that is in a non-rectangular format, wherein the tagged input data is organized such that a hierarchical arrangement of tags indicates data relationships between one or more parent tags and one or more child tags, and wherein each parent tag is associated with one or more child tags;

using the data relationships to determine rectangularization characteristics for the tagged input data;

displaying the tagged input data in a graphical interface;

receiving, through the graphical interface, an interaction with the tagged input data;]

*one or more processors;*

*one or more computer readable storage mediums containing instructions to cause the one or more processors to perform operations including:* generating [a] *the second data file, wherein the second data file includes the* mapping specification [from the tagged input data, wherein the mapping specification is generated based upon the rectangularization characteristics and the interaction, and], wherein the mapping specification [identifies one or more tables;]:

*includes one or more data directives that indicate relationships between data in the first data file, wherein the data directives are used to parse content from the first data file and to format the parsed content into rectangular formatted data, wherein the data directives include one or more XPath specifications specifying data items and*

*locations associated with the data items that are to be extracted from hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

[generating] *identifies* a single table corresponding to each data relationship between a parent tag and one or more child tags, wherein *the format of* the single table is [generated] *determined* using the [mapping specification] *data directives*;

[receiving rectangular formatted input data that uses columns and rows to indicate data relationships;

generating tagged output data using the rectangular formatted input data and the mapping specification, wherein the tagged output data is in a non-rectangular format, wherein the tagged output data uses a hierarchical arrangement of tags to indicate data relationships between one or more parent tags and one or more child tags, and wherein each parent tag is associated with one or more child tags; and]

*receiving a set of program instructions including:*

*an indication of a location of the first data file, the first data file including a hierarchically arranged tagged input data structure in non-rectangular format configured to be transformed into rectangular format;*

*an indication of a location of the second data file, the second data file different than the first data file;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*using the indication of the location of the first data file to access the first data file;*

*displaying the tagged input data in a graphical interface;*

*receiving, through the graphical interface, an interaction with the tagged input data;*

*transforming the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generating an output of the procedure using the output data structure in rectangular format; and* coordinating bi-directional communication between a software application that uses a hierarchical data format and a software application that uses a rectangularized data format, wherein coordinating bi-directional communication includes using the single table and the [tagged] output data *structure*.

2. The computer-implemented method of claim [1] *17*, wherein a generating the [mapping specification] *second data file* further includes identifying repeating patterns in the tagged input data.

[3. The computer-implemented method of claim 1, further comprising:

creating one or more XPath locators, wherein an XPath locator identifies a place to extract data items from the tagged input data.]

4. The computer-implemented method of claim [1] *17*, further comprising:

using a mapping engine to read the mapping specification and prepare an XPath list, wherein the XPath list specifies particular data items for extraction from the tagged input data.

5. The computer-implemented method of claim [1] *17*, further comprising:

recording metadata associated with the tagged input data; and using the recorded metadata to provide one or more data storage locations by projecting one or more tables.

6. The computer-implemented method of claim [1] *17*, wherein the graphical interface includes one or more tabs, the one or more tabs including at least one of a properties tab, a format tab, a processing tab, an ordinal tab, and a validation tab.

7. The computer implemented method of claim 6, further comprising:

using the one or more tabs to specify *the* one or more data directives.

8. The computer implemented method of claim 7, further comprising:

using the one or more data directives to process one or more tagged data items of the tagged input data into rectangular formatted data; and using the one or more data directives to process rectangular formatted input data into one or more tagged data items of [tagged] output data.

9. A [system, comprising:

one or more processors;

one or more computer readable storage mediums containing instructions to cause the one or more processors to perform operations including:] *non-transitory computer program product for transforming a first data file, including a hierarchically arranged tagged input data structure, to an output data structure in rectangular format, using a mapping specification in a second data file for use in a procedure, the non-transitory computer program product tangibly embodied in a non-transitory machine readable storage medium, including instructions operable to cause a data processing apparatus to:*

[receiving tagged input data that is in a non-rectangular format, wherein the tagged input data is organized such that a hierarchical arrangement of tags indicates data relationships between one or more parent tags and one or more child tags, and wherein each parent tag is associated with one or more child tags;

using the data relationships to determine rectangularization characteristics for the tagged input data;

displaying the tagged input data in a graphical interface;

receiving, through the graphical interface, an interaction with the tagged input data;]

generating a *generate the second data file, wherein the second data file includes the* mapping specification [from the tagged input data, wherein the mapping specification is generated based upon the rectangularization characteristics and the interaction, and], wherein the mapping specification [identifies one or more tables;]:

*includes one or more data directives that indicate relationships between data in the first data file, wherein the data directives are used to parse content from the first data file and to format the parsed content into rectangular formatted data, wherein the data directives include one or more XPath specifications specifying data items and locations associated with the data items that are to be extracted from hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

[generating] *identifies* a single table corresponding to each data relationship between a parent tag and one or more child tags, wherein *the format of* the single table is [generated] *determined* using the [mapping specification] *data directives*;

[receiving rectangular formatted input data that uses columns and rows to indicate data relationships;

generating tagged output data using the rectangular formatted input data and the mapping specification, wherein the tagged output data is in a non-rectangular format, wherein the tagged output data uses a hierarchical arrangement of tags to indicate data relationships between one or more parent tags and one or more child tags, and wherein each parent tag is associated with one or more child tags; and]

*receive a set of program instructions including:*

*an indication of a location of the first data file, the first data file including a hierarchically arranged tagged input data structure in non-rectangular format configured to be transformed into rectangular format;*

*an indication of a location of the second data file, the second data file different than the first data file;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*use the indication of the location of the first data file to access the first data file;*

*display the tagged input data in a graphical interface;*

*receive, through the graphical interface, an interaction with the tagged input data;*

*transform the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generating an output of the procedure using the output data structure in rectangular format; and*

[coordinating] *coordinate* bi-directional communication between an application that uses a hierarchical data format and a software application that uses a rectangularized data format, wherein coordinating bi-directional communication includes using the single table and the [tagged] output data *structure*.

10. The system of claim [9] *1*, wherein the one or more computer readable storage mediums further comprise instructions to cause the one or more processors to perform operations including generating the [mapping specification] *second data file* by identifying repeating patterns in the tagged input data.

[11. The system of claim 9, wherein the one or more computer readable storage mediums further comprise instructions to cause the one or more processors to perform operations including creating one or more XPath locators, wherein an XPath locator identifies a place to extract data items from the tagged input data.]

12. The system of claim [9] *1*, wherein the one or more computer readable storage mediums further comprise instructions to cause the one or more processors to perform operations including using a mapping engine to read the mapping specification and prepare an XPath list, wherein the XPath list specifies particular data items for extraction from the tagged input data.

13. The system of claim [9] *1*, wherein the one or more computer readable storage mediums further comprise instructions to cause the one or more processors to perform operations including:

recording metadata associated with the tagged input data; and using the recorded metadata to provide one or more data storage locations by projecting one or more tables.

14. The system of claim [9] *1*, wherein the graphical interface includes one or more tabs, the one or more tabs including at least one of a properties tab, a format tab, a processing tab, an ordinal tab, and a validation tab.

15. The system of claim 14, wherein the one or more tabs are configured to specify *the* one or more data directives.

16. The system of claim 15, wherein the one or more data directives are configured to process one or more tagged data items of the tagged input data into rectangular formatted data, and wherein the one or more data directives are configured to process rectangular formatted input data into one or more tagged data items of [tagged] output data.

17. A non-transitory computer program product *for transforming a first data file, including a hierarchically arranged tagged input data structure, to an output data structure in rectangular format, using a mapping specification in a second data file for use in a procedure, the non-transitory computer program product* tangibly embodied in a non-transitory machine readable storage medium, including instructions operable to cause a data processing apparatus to:

[receive tagged input data that is in a non-rectangular format, wherein the tagged input data is organized such that a hierarchical arrangement of tags indicates data relationships between one or more parent tags and one or more child tags, and wherein each parent tag is associated with one or more child tags;

use the data relationships to determine rectangularization characteristics for the tagged input data;

display the tagged input data in a graphical interface;

receive, through the graphical interface, an interaction with the tagged input data;]

generate [a] *the second data file, wherein the second data file includes the* mapping specification [from the tagged input data, wherein the mapping specification is generated based upon the rectangularization characteristics and the interaction, and], wherein the mapping specification [identifies one or more tables]*:*

*includes one or more data directives that indicate relationships between data in the first data file, wherein the data directives are used to parse content from the first data file and to format the parsed content into rectangular formatted data, wherein the data directives include one or more XPath specifications specifying data items and locations associated with the data items that are to be extracted from hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

[generate] *identifies* a single table corresponding to each data relationship between a parent tag and one or more child tags, wherein *the format of* the single table is [generated] *determined* using the [mapping specification] *data directives*;

[receive rectangular formatted input data that uses columns and rows to indicate data relationships;

generate tagged output data using the rectangular formatted input data and the mapping specification, wherein the tagged output data is in a non-rectangular format, wherein the tagged output data uses a hierarchical arrangement of tags to indicate data relationships between one or more parent tags and one or more child tags, and wherein each parent tag is associated with one or more child tags; and]

*receive a set of program instructions including:*

*an indication of a location of the first data file, the first data file including a hierarchically arranged tagged input data structure in non-rectangular format configured to be transformed into rectangular format;*

*an indication of a location of the second data file, the second data file different than the first data file;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*use the indication of the location of the first data file to access the first data file;*

*display the tagged input data in a graphical interface;*

*receive, through the graphical interface, an interaction with the tagged input data;*

*transform the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generating an output of the procedure using the output data structure in rectangular format; and* coordinate bi-directional communication between [an] *a software* application that uses a hierarchical data format and a software application that uses a rectangularized data format, wherein coordinating bi-directional communication includes using the single table and the [tagged] output data *structure*.

18. The computer program product of claim [17] *9*, further comprising instructions to generate the [mapping specification] *second data file* by identifying repeating patterns in the tagged input data.

[19. The computer program product of claim 17, further comprising instructions to create one or more XPath locators, wherein an XPath locator is configured to identify a place to extract data items from the tagged input data.]

20. The computer program product of claim [17] *9*, further comprising instructions to use a mapping engine to read the mapping specification and prepare an XPath list, wherein the XPath list is configured to specify particular data items for extraction from the tagged input data.

21. The computer program product of claim [17] *9*, further comprising instructions to:

record metadata associated with the tagged input data; and use the recorded metadata to provide one or more data storage locations by projecting one or more tables.

22. The computer program product of claim [17] *9*, wherein the graphical interface includes one or more tabs, the one or more tabs including at least one of a properties tab, a format tab, a processing tab, an ordinal tab, and a validation tab.

23. The computer program product of claim 22, wherein the one or more tabs are configured to specify *the* one or more data directives.

24. The computer program product of claim 23, wherein the one or more data directives are configured to process one or more tagged data items of the tagged input data into rectangular formatted data, and wherein the one or more data directives are configured to process rectangular formatted input data into one or more tagged data items of the [tagged] output data.

*25. A system for transforming a first data file, including a hierarchically arranged tagged input data structure, to an output data structure in rectangular format, using a mapping specification in a second data file for use in a procedure, the system comprising:*

*one or more processors;*

*a computer-readable storage medium containing instructions configured to cause the one or more processors to perform operations, including:*

*forming the second data file, wherein the second data file includes a mapping specification, wherein the mapping specification:*

*includes one or more data directives, which indicate relationships between data in the first data file, wherein the data directives are used to parse content from the first data file and to format the parsed content into rectangular formatted data, wherein the data directives include one or more XPath specifications specifying data items and locations associated with the data items that are to be extracted from the hierarchically arranged tagged input data for use in generating output data in rectangular format; and*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

*identifies one or more tables that will be generated from the hierarchically arranged tagged input data, and wherein each association between a parent tag and two or more child tags forms a single corresponding table specific to that association;*

*receiving a set of program instructions including:*

*an indication of a location of the first data file, the first data file including a hierarchically arranged tagged input data structure in non-rectangular format configured to be transformed into rectangular format, wherein the tagged input data is in an eXtensible Markup Language (XML) format;*

*an indication of a location of the second data file, the second data file different than the first data file;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*using the indication of the location of the first data file to access the first data file;*

*transforming the first data file to an output data structure in rectangular format compatible with the procedure, by:*

*parsing the hierarchically arranged tagged input data in accordance with the data directives, including the one or more XPath specifications; and*

*generating the output data structure in rectangular format by assembling the parsed hierarchically arranged tagged input data into rectangular format; and*

*generating an output of the procedure using the output data structure in rectangular format.*

*26. The system of claim 25, the computer-readable storage medium further containing instructions configured to cause the one or more processors to perform operations, including:*

*checking encoding contained in the mapping specification to ensure the encoding conforms to a tagged input data.*

*27. The system of claim 25, the computer-readable storage medium further containing instructions configured to cause the one or more processors to perform operations, including:*

*recording metadata, the metadata facilitating data conversion from source data formats to destination data formats, column length alignment, and data buffering prioritization for projection.*

*28. The system of claim 27, the computer-readable storage medium further containing instructions configured to cause the one or more processors to perform operations, including:*

*projecting one or more tables and one or more columns.*

*29. The system of claim 25, wherein the tagged input data includes one or more pcdata fields within the tags of the tagged input data, and wherein the tagged input data includes one or more attributes within the tags of the tagged input data.*

*30. The system of claim 25, wherein the one or more data directives include a hierarchical arrangement of tags indicating one or more relationships among conversion operations and attributes corresponding to the one or more data directives.*

*31. The system of claim 30, wherein the one or more data relationships provide information about how the conversion operations and the attributes corresponding to the one or more data directives are used to automatically parse the tagged input data.*

*32. The system of claim 25, wherein the one or more data directives include one or more definitions.*

*33. The system of claim 32, wherein the one or more definitions include a column length.*

*34. The system of claim 32, wherein the one or more definitions include a column data type.*

*35. The system of claim 32, wherein the one or more definitions include a column type.*

*36. The system of claim 32, wherein the one or more definitions include acceptable values for a column.*

*37. The system of claim 32, wherein the one or more definitions include an indication that a value for a data item within the tagged input data is retained until a new value for the data item is encountered in the tagged input data.*

*38. The system of claim 32, wherein the one or more definitions include a selection criterion for filtering one or more data items contained within the tagged input data.*

*39. The system of claim 32, wherein the one or more definitions include a string function.*

*40. The system of claim 32, wherein the one or more definitions include an axes function.*

*41. The system of claim 32, wherein the one or more definitions include a node-related function.*

*42. The system of claim 25, wherein a default value is specified and applied when a value for a data item within the tagged input data is missing.*

*43. The system of claim 25, wherein column content of the output data structure is generated based upon one or more data items contained within the tagged input data.*

*44. The system of claim 25, wherein an XML parser is used to automatically parse the tagged input data based upon the one or more data directives.*

*45. The system of claim 25, wherein the tagged input data includes one or more tagged hierarchical paths, and wherein a specific tagged hierarchical path uses an XML path descriptor to identify which of the tags in the tagged input data is to be used as an indicator.*

*46. A computer-program product, tangibly embodied in a machine-readable storage medium, including instructions configured to cause a data processing apparatus to:*

*forming the second data file, wherein the second data file includes a mapping specification, wherein the mapping specification:*

*includes one or more data directives, which indicate relationships between data in the first data file, wherein the data directives are used to parse content from the first data file and to format the parsed content into rectangular formatted data, wherein the data directives include one or more XPath specifications specifying data items and locations associated with the data items that are to be extracted from the hierarchically arranged tagged input data for use in generating output data in rectangular format; and*

*is based on rectangularization characteristics for the hierarchically arranged tagged input data, wherein the rectangularization characteristics are based on one or more data relationships between one or more parent*

*tags and one or more child tags, wherein each parent tag is associated with two or more child tags and wherein each association between a parent tag and two or more child tags forms a single corresponding table specific to that association, and*

*identifies one or more tables that will be generated from the hierarchically arranged tagged input data, and wherein each association between a parent tag and two or more child tags forms a single corresponding table specific to that association;*

*receive a set of program instructions including:*

*an indication of a location of the first data file, the first data file including a hierarchically arranged tagged input data structure in non-rectangular format configured to be transformed into rectangular format, wherein the tagged input data is in an eXtensible Markup Language (XML) format;*

*an indication of a location of the second data file, the second data file different than the first data file;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*use the indication of the location of the first data file to access the first data file;*

*transform the first data file to an output data structure in rectangular format compatible with the procedure, by:*

*parsing the hierarchically arranged tagged input data in accordance with the data directives, including the one or more XPath specifications; and*

*generating the output data structure in rectangular format by assembling the parsed hierarchically arranged tagged input data into rectangular format; and*

*generate an output of the procedure using the output data structure in rectangular format.*

*47. The computer-program product of claim 46, further comprising instructions configured to cause a data processing apparatus to:*

*check encoding contained in the mapping specification to ensure the encoding conforms to a tagged input data.*

*48. The computer-program product of claim 46, further comprising instructions configured to cause a data processing apparatus to:*

*record metadata, the metadata facilitating data conversion from source data formats to destination data formats, column length alignment, and data buffering prioritization for projection.*

*49. The computer-program product of claim 48, further comprising instructions configured to cause a data processing apparatus to:*

*project one or more tables and one or more columns.*

*50. The computer-program product of claim 46, wherein the tagged input data includes one or more pcdata fields within the tags of the tagged input data, and wherein the tagged input data includes one or more attributes within the tags of the tagged input data.*

*51. The computer-program product of claim 46, wherein the one or more data directives include a hierarchical arrangement of tags indicating one or more relationships among conversion operations and attributes corresponding to the one or more data directives.*

*52. The computer-program product of claim 51, wherein the one or more data relationships provide information about how the conversion operations and the attributes corresponding to the one or more data directives are used to automatically parse the tagged input data.*

*53. The computer-program product of claim 46, wherein the one or more data directives include one or more definitions.*

*54. The computer-program product of claim 53, wherein the one or more definitions include a column length.*

*55. The computer-program product of claim 53, wherein the one or more definitions include a column data type.*

*56. The computer-program product of claim 53, wherein the one or more definitions include a column type.*

*57. The computer-program product of claim 53, wherein the one or more definitions include acceptable values for a column.*

*58. The computer-program product of claim 53, wherein the one or more definitions include an indication that a value for a data item within the tagged input data is retained until a new value for the data item is encountered in the tagged input data.*

*59. The computer-program product of claim 53, wherein the one or more definitions include a selection criterion for filtering one or more data items contained within the tagged input data.*

*60. The computer-program product of claim 53, wherein the one or more definitions include a string function.*

*61. The computer-program product of claim 53, wherein the one or more definitions include an axes function.*

*62. The computer-program product of claim 53, wherein the one or more definitions include a node-related function.*

*63. The computer-program product of claim 46, wherein a default value is specified and applied when a value for a data item within the tagged input data is missing.*

*64. The computer-program product of claim 46, wherein column content of the output data structure is generated based upon one or more data items contained within the tagged input data.*

*65. The computer-program product of claim 46, wherein an XML parser is used to automatically parse the tagged input data based upon the one or more data directives.*

*66. The computer-program product of claim 46, wherein the tagged input data includes one or more tagged hierarchical paths, and wherein a specific tagged hierarchical path uses an XML path descriptor to identify which of the tags in the tagged input data is to be used as an indicator.*

*67. A data structure conversion method to transform a data structure into a format compatible with one or more procedures, the method comprising:*

*receiving a set of program instructions including:*

*an indication of a location of a first data file, the first data file including a hierarchically arranged tagged input data structure in non-rectangular format configured to be transformed into rectangular format;*

*an indication of a location of a second data file different than the first data file, wherein the second data file includes a mapping specification used to transform the hierarchically arranged tagged input data structure into rectangular format;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*using the indication of the location of the first data file to access the first data file; using the indication of the location of the second data file, accessing the second*

*data file, the second data file including the mapping specification, wherein the mapping specification:*

*includes one or more data directives that indicate relationships between data in the first data file, wherein the data directives are used to parse content from the first data file and to format the parsed content into rectangular formatted data, wherein the data directives include one or more XPath specifications specifying data items and locations associated with the data items that are to be extracted from the hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

*identifies one or more tables to be generated from the hierarchically arranged tagged input data, wherein the format of the one or more tables is determined using the data directives;*

*transforming the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generating an output of the procedure using the output data structure in rectangular format.*

*68. The method of claim 67, further comprising:*

*checking encoding contained in the mapping specification to ensure the encoding conforms to a data hierarchy of the tagged input data.*

*69. The method of claim 67, further comprising:*

*recording metadata, the metadata facilitating data conversion from source data formats to destination data formats, column length alignment, and data buffering prioritization for projection.*

*70. The method of claim 69, further comprising:*

*projecting one or more tables and one or more columns.*

*71. The method of claim 67, wherein the tagged input data is in an eXtensible Markup Language (XML) format.*

*72. The method of claim 67, wherein the tagged input data includes one or more pcdata fields within the tags of the tagged input data, and wherein the tagged input data includes one or more attributes within the tags of the tagged input data.*

*73. The method of claim 67, wherein the one or more data directives include a hierarchical arrangement of tags indicating one or more relationships among conversion operations and attributes corresponding to the one or more data directives.*

*74. The method of claim 73, wherein the one or more data relationships provide information about how the conversion operations and the attributes corresponding to the one or more data directives are used to automatically parse the tagged input data.*

*75. The method of claim 67, wherein the one or more data directives include one or more definitions.*

*76. The method of claim 75, wherein the one or more definitions include a column length.*

*77. The method of claim 75, wherein the one or more definitions include a column data type.*

*78. The method of claim 75, wherein the one or more definitions include a column type.*

*79. The method of claim 75, wherein the one or more definitions include acceptable values for a column.*

*80. The method of claim 75, wherein the one or more definitions include an indication that a value for a data item within the tagged input data is retained until a new value for the data item is encountered in the tagged input data.*

*81. The method of claim 75, wherein the one or more definitions include a selection criterion for filtering one or more data items contained within the tagged input data.*

*82. The method of claim 75, wherein the one or more definitions include a string function.*

*83. The method of claim 75, wherein the one or more definitions include an axes function.*

*84. The method of claim 75, wherein the one or more definitions include a node-related function.*

*85. The method of claim 67, wherein a default value is specified and applied when a value for a data item within the tagged input data is missing.*

*86. The method of claim 67, wherein column content of the output data structure is generated based upon one or more data items contained within the tagged input data.*

*87. The method of claim 67, wherein an XML parser is used to automatically parse the tagged input data based upon the one or more data directives.*

*88. The method of claim 67, wherein the tagged input data includes one or more tagged hierarchical paths, and wherein a specific tagged hierarchical path uses an XML path descriptor to identify which of the tags in the tagged input data is to be used as an indicator.*

*89. A system, comprising:*

*one or more processors;*

*a computer-readable storage medium containing instructions configured to cause the one or more processors to perform operations, including:*

*receiving a set of program instructions including:*

*an indication of a location of a first data file, the first data file including a hierarchically arranged tagged input data structure in non-rectangular format configured to be transformed into rectangular format;*

*an indication of a location of a second data file different than the first data file, wherein the second data file includes a mapping specification used to transform the hierarchically arranged tagged input data structure into rectangular format;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*using the indication of the location of the first data file to access the first data file; using the indication of the location of the second data file, accessing the second data file, the second data file including the mapping specification, wherein the mapping specification:*

*includes one or more data directives that indicate relationships between data in the first data file, wherein the data directives are used to parse content from the first data file and to format the parsed content into rectangular formatted data, wherein the data directives*

*include one or more XPath specifications specifying data items and locations associated with the data items that are to be extracted from the hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

*identifies one or more tables to be generated from the hierarchically arranged tagged input data, wherein the format of the one or more tables is determined using the data directives;*

*transforming the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generating an output of the procedure using the output data structure in rectangular format.*

*90. The system of claim 89, the computer-readable storage medium further containing instructions configured to cause the one or more processors to perform operations, including:*

*checking encoding contained in the mapping specification to ensure the encoding conforms to a data hierarchy of the tagged input data.*

*91. The system of claim 89, the computer-readable storage medium further containing instructions configured to cause the one or more processors to perform operations, including:*

*recording metadata, the metadata facilitating data conversion from source data formats to destination data formats, column length alignment, and data buffering prioritization for projection.*

*92. The system of claim 91, the computer-readable storage medium further containing instructions configured to cause the one or more processors to perform operations, including:*

*projecting one or more tables and one or more columns.*

*93. The system of claim 89, wherein the tagged input data is in an eXtensible Markup Language (XML) format.*

*94. The system of claim 89, wherein the tagged input data includes one or more pcdata fields within the tags of the tagged input data, and wherein the tagged input data includes one or more attributes within the tags of the tagged input data.*

*95. The system of claim 89, wherein the one or more data directives include a hierarchical arrangement of tags indicating one or more relationships among conversion operations and attributes corresponding to the one or more data directives.*

*96. The system of claim 95, wherein the one or more data relationships provide information about how the conversion operations and the attributes corresponding to the one or more data directives are used to automatically parse the tagged input data.*

*97. The system of claim 89, wherein the one or more data directives include one or more definitions.*

*98. The system of claim 97, wherein the one or more definitions include a column length.*

*99. The system of claim 97, wherein the one or more definitions include a column data type.*

*100. The system of claim 97, wherein the one or more definitions include a column type.*

*101. The system of claim 97, wherein the one or more definitions include acceptable values for a column.*

*102. The system of claim 97, wherein the one or more definitions include an indication that a value for a data item within the tagged input data is retained until a new value for the data item is encountered in the tagged input data.*

*103. The system of claim 97, wherein the one or more definitions include a selection criterion for filtering one or more data items contained within the tagged input data.*

*104. The system of claim 97, wherein the one or more definitions include a string function.*

*105. The system of claim 97, wherein the one or more definitions include an axes function.*

*106. The system of claim 97, wherein the one or more definitions include a node-related function.*

*107. The system of claim 89, wherein a default value is specified and applied when a value for a data item within the tagged input data is missing.*

*108. The system of claim 89, wherein column content of the output data structure is generated based upon one or more data items contained within the tagged input data.*

*109. The system of claim 89, wherein an XML parser is used to automatically parse the tagged input data based upon the one or more data directives.*

*110. The system of claim 89, wherein the tagged input data includes one or more tagged hierarchical paths, and wherein a specific tagged hierarchical path uses an XML path descriptor to identify which of the tags in the tagged input data is to be used as an indicator.*

*111. A computer-program product tangibly embodied in a non-transitory machine-readable storage medium, including instructions configured to cause a data processing apparatus to:*

*receive a set of program instructions including:*

*an indication of a location of a first data file, the first data file including a hierarchically arranged tagged input data structure in non-rectangular format configured to be transformed into rectangular format;*

*an indication of a location of a second data file different than the first data file, wherein the second data file includes a mapping specification used to transform the hierarchically arranged tagged input data structure into rectangular format;*

*a libname statement identifying the first data file, the second data file, and an XML libname engine; and*

*an indication of a procedure to process a data file and an indication of the data file to process, wherein the procedure requires data in rectangular format and the indication of the data file to process indicates the first data file in non-rectangular format;*

*use the indication of the location of the first data file to access the first data file; use the indication of the location of the second data file, accessing the second data file, the second data file including the mapping specification, wherein the mapping specification:*

*includes one or more data directives that indicate relationships between data in the first data file, wherein the data directives are used to parse content from the first data file and to format the parsed content into rectan-*

*gular formatted data, wherein the data directives include one or more XPath specifications specifying data items and locations associated with the data items that are to be extracted from the hierarchically arranged tagged input data for use in generating output data in rectangular format,*

*is based on rectangularization characteristics for the hierarchically arranged tagged input data, wherein the rectangularization characteristics are based on one or more data relationships between one or more parent tags and one or more child tags, wherein each parent tag is associated with two or more child tags and wherein each association between a parent tag and two or more child tags forms a single corresponding table specific to that association, and*

*identifies one or more tables to be generated from the hierarchically arranged tagged input data, wherein the format of the one or more tables is determined using the data directives;*

*transform the first data file to an output data structure in rectangular format compatible with the procedure, by:*

*parsing the hierarchically arranged tagged input data in accordance with the data directives, including the one or more XPath specifications;*

*generating the output data structure in rectangular format by assembling the parsed hierarchically arranged tagged input data into rectangular format; and*

*generate an output of the procedure using the output data structure in rectangular format.*

*112. The computer-program product of claim 111, further comprising instructions configured to cause a data processing apparatus to:*

*check encoding contained in the mapping specification to ensure the encoding conforms to a data hierarchy of the tagged input data.*

*113. The computer-program product of claim 111, further comprising instructions configured to cause a data processing apparatus to:*

*record metadata, the metadata facilitating data conversion from source data formats to destination data formats, column length alignment, and data buffering prioritization for projection.*

*114. The computer-program product of claim 113, further comprising instructions configured to cause a data processing apparatus to:*

*project one or more tables and one or more columns.*

*115. The computer-program product of claim 111, wherein the tagged input data is in an eXtensible Markup Language (XML) format.*

*116. The computer-program product of claim 111, wherein the tagged input data includes one or more pcdata fields within the tags of the tagged input data, and wherein the tagged input data includes one or more attributes within the tags of the tagged input data.*

*117. The computer-program product of claim 111, wherein the one or more data directives include a hierarchical arrangement of tags indicating one or more relationships among conversion operations and attributes corresponding to the one or more data directives.*

*118. The computer-program product of claim 117, wherein the one or more data relationships provide information about how the conversion operations and the attributes corresponding to the one or more data directives are used to automatically parse the tagged input data.*

*119. The computer-program product of claim 111, wherein the one or more data directives include one or more definitions.*

*120. The computer-program product of claim 119, wherein the one or more definitions include a column length.*

*121. The computer-program product of claim 119, wherein the one or more definitions include a column data type.*

*122. The computer-program product of claim 119, wherein the one or more definitions include a column type.*

*123. The computer-program product of claim 119, wherein the one or more definitions include acceptable values for a column.*

*124. The computer-program product of claim 119, wherein the one or more definitions include an indication that a value for a data item within the tagged input data is retained until a new value for the data item is encountered in the tagged input data.*

*125. The computer-program product of claim 119, wherein the one or more definitions include a selection criterion for filtering one or more data items contained within the tagged input data.*

*126. The computer-program product of claim 119, wherein the one or more definitions include a string function.*

*127. The computer-program product of claim 119, wherein the one or more definitions include an axes function.*

*128. The computer-program product of claim 119, wherein the one or more definitions include a node-related function.*

*129. The computer-program product of claim 111, wherein a default value is specified and applied when a value for a data item within the tagged input data is missing.*

*130. The computer-program product of claim 111, wherein column content of the output data structure is generated based upon one or more data items contained within the tagged input data.*

*131. The computer-program product of claim 111, wherein an XML parser is used to automatically parse the tagged input data based upon the one or more data directives.*

*132. The computer-program product of claim 111, wherein the tagged input data includes one or more tagged hierarchical paths, and wherein a specific tagged hierarchical path uses an XML path descriptor to identify which of the tags in the tagged input data is to be used as an indicator.*

*133. The method of claim 67, wherein determining the second data file includes receiving the second data file or generating the second data file.*

*134. The method of claim 67, wherein a first pass through the first data set is used to access the first data file and transform the first data file to an output data structure in rectangular format, and a second pass through the first data set is used to generate the output of the procedure using the output data structure in rectangular format.*

*135. The method of claim 67, wherein the procedure is invoked by a SAS proc statement.*

*136. The method of claim 67, wherein the mapping specification comprises mapping specification controls including one or more format tags and one or more informat tags that indicate characteristics of the output data structure.*

*137. The system of claim 89, wherein determining the second data file includes receiving the second data file or generating the second data file.*

*138. The system of claim 89, wherein a first pass through the first data set is used to access the first data file and transform the first data file to an output data structure in rectangular format, and a second pass through the first data*

*set is used to generate the output of the procedure using the output data structure in rectangular format.*

*139. The system of claim 89, wherein the procedure is invoked by a SAS proc statement.*

*140. The system of claim 89, wherein the mapping specification comprises mapping specification controls including one or more format tags and one or more informat tags that indicate characteristics of the output data structure.*

*141. The computer-program product of claim 111, wherein determining the second data file includes receiving the second data file or generating the second data file.*

*142. The computer-program product of claim 111, wherein a first pass through the first data set is used to access the first data file and transform the first data file to an output data structure in rectangular format, and a second pass through the first data set is used to generate the output of the procedure using the output data structure in rectangular format.*

*143. The computer-program product of claim 111, wherein the procedure is invoked by a SAS proc statement.*

*144. The computer-program product of claim 111, wherein the mapping specification comprises mapping specification controls including one or more format tags and one or more informat tags that indicate characteristics of the output data structure.*

* * * * *